US011839884B2

(12) United States Patent
Johnston et al.

(10) Patent No.: US 11,839,884 B2
(45) Date of Patent: Dec. 12, 2023

(54) COUNTERFLOW VORTEX BREAKER

(71) Applicant: Sand Separation Technologies Inc., Acheson (CA)

(72) Inventors: Chris Michael Johnston, St. Albert (CA); Dustin Mackenzie Wohlgemuth, Greenview (CA); Mohsen Bayati, Calgary (CA)

(73) Assignee: Sand Separation Technologies Inc., Acheson (CA)

( * ) Notice: Subject to any disclaimer, the term of this patent is extended or adjusted under 35 U.S.C. 154(b) by 498 days.

(21) Appl. No.: 17/273,268

(22) PCT Filed: Aug. 23, 2019

(86) PCT No.: PCT/CA2019/051160
§ 371 (c)(1),
(2) Date: Mar. 3, 2021

(87) PCT Pub. No.: WO2020/047649
PCT Pub. Date: Mar. 12, 2020

(65) Prior Publication Data
US 2021/0323003 A1    Oct. 21, 2021

Related U.S. Application Data

(60) Provisional application No. 62/727,938, filed on Sep. 6, 2018.

(51) Int. Cl.
*B04C 5/10*   (2006.01)
*B04C 5/04*   (2006.01)
(Continued)

(52) U.S. Cl.
CPC .............. *B04C 5/103* (2013.01); *B01D 45/02* (2013.01); *B04C 5/04* (2013.01); *B04C 5/12* (2013.01);
(Continued)

(58) Field of Classification Search
CPC .. B04C 5/103; B04C 5/04; B04C 5/12; B04C 5/14; B04C 5/081; B01D 45/02; B01D 45/08
(Continued)

(56) References Cited

U.S. PATENT DOCUMENTS 2,917,131 A    12/1959 Evans
3,353,924 A    11/1967 Riopelle
(Continued)

FOREIGN PATENT DOCUMENTS

CA    2 229 301 A1    10/1999
CA    2 776 606 A1    11/2012
(Continued)

OTHER PUBLICATIONS

International Search Report for Application No. PCT/CA2019/051160, dated Oct. 22, 2019, 3 pgs.

*Primary Examiner* — Fred Prince
(74) *Attorney, Agent, or Firm* — SEED INTELLECTUAL PROPERTY LAW GROUP LLP

(57) ABSTRACT

A vortex breaker for a particulate separator has a first set of vanes spaced along a perimeter of a first shape and a second set of vanes spaced along a perimeter of a second shape, where the second shape resides within the first shape. Each of the vanes has a top edge, a bottom edge, an inside edge, and an outside edge. The vanes in the first and second sets of vanes intersect the first and second shapes, respectively. The vanes in the first set are oriented in a first rotational direction, and the vanes in the second set are oriented in a second rotational direction that is opposite the first rotational direction. The first set of vanes and the second set of vanes define fluid flow paths between the outside edges and the inside edges of the sets of vanes.

31 Claims, 19 Drawing Sheets

(51) Int. Cl.
  *B04C 5/12*    (2006.01)
  *B04C 5/14*    (2006.01)
  *B01D 45/02*   (2006.01)
  *B04C 5/08*    (2006.01)
  *B01D 45/08*   (2006.01)
  *B04C 5/103*   (2006.01)
  *B04C 5/081*   (2006.01)

(52) U.S. Cl.
  CPC ............... *B04C 5/14* (2013.01); *B01D 45/08* (2013.01); *B04C 5/081* (2013.01)

(58) Field of Classification Search
  USPC ............................. 210/512.1, 512.2, 512.3
  See application file for complete search history.

(56) References Cited

U.S. PATENT DOCUMENTS

| | | |
|---|---|---|
| 4,519,848 A | 5/1985 | Underwood |
| 4,626,360 A | 12/1986 | Senyard, Sr. et al. |
| 4,673,500 A | 6/1987 | Hoofnagle et al. |
| 4,778,494 A | 10/1988 | Patterson |
| 4,783,272 A | 11/1988 | Patterson |
| 4,859,323 A | 8/1989 | Rolfvondenbaumen |
| 4,913,819 A | 4/1990 | Patterson |
| 4,948,383 A | 8/1990 | Hodson et al. |
| 4,948,393 A | 8/1990 | Hodson |
| 5,295,537 A | 3/1994 | Trainer |
| 5,344,255 A | 9/1994 | Toor |
| 5,662,167 A | 9/1997 | Patterson et al. |
| 5,865,992 A | 2/1999 | Edmondson |
| 5,928,519 A | 7/1999 | Homan |
| 6,119,779 A | 9/2000 | Gipson et al. |
| 6,119,870 A | 9/2000 | Maciejewski et al. |
| 6,158,512 A | 12/2000 | Unsgaard |
| 6,189,617 B1 | 2/2001 | Sorhus et al. |
| 6,214,092 B1 | 4/2001 | Odom et al. |
| 6,269,880 B1 | 8/2001 | Laundry |
| 6,315,837 B1 | 11/2001 | Barclay |
| 6,350,375 B1 | 2/2002 | Bringedal et al. |
| 6,537,458 B1 | 3/2003 | Polderman |
| 6,790,367 B2 | 9/2004 | Schmigel et al. |
| 6,983,852 B2 | 1/2006 | Hemstock et al. |
| 7,179,386 B2 | 2/2007 | Lange |
| 7,278,543 B2 | 10/2007 | Sagatun et al. |
| 7,731,037 B2 | 6/2010 | Frazier et al. |
| 7,785,400 B1 | 8/2010 | Worley et al. |
| 7,909,092 B2 | 3/2011 | Cobb |
| 8,308,959 B2 | 11/2012 | Noles, Jr. |
| 8,317,904 B2 | 11/2012 | Sarshar et al. |
| 8,454,843 B2 | 6/2013 | Brown et al. |
| 8,470,080 B1 | 6/2013 | Ball, IV et al. |
| 8,623,221 B1 | 1/2014 | Boyd et al. |
| 8,651,184 B2 | 2/2014 | Raglin |
| 8,662,167 B2 | 3/2014 | Wildhack et al. |
| 8,784,670 B2 | 7/2014 | Zylla |
| 8,893,781 B2 | 11/2014 | Kayser |
| 8,945,256 B2 | 2/2015 | Hemstock |
| 8,945,395 B2 | 2/2015 | Tweit et al. |
| 8,945,399 B2 | 2/2015 | Howard |
| 8,961,662 B2 | 2/2015 | Hughes et al. |
| 9,089,792 B2 | 7/2015 | Zylla |
| 9,199,251 B1 | 12/2015 | Ball, IV |
| 9,387,432 B2 | 7/2016 | Zainal Abidin et al. |
| 9,616,431 B2 | 4/2017 | Lyon et al. |
| 9,925,484 B2 | 3/2018 | Lyon et al. |
| 10,605,064 B1 | 3/2020 | Raglin |
| 10,717,026 B1 | 7/2020 | Anderson et al. |
| 10,751,654 B1 | 8/2020 | Kulbeth |
| 11,035,216 B2 | 6/2021 | Hemstock |
| 11,040,300 B1 | 6/2021 | Kulbeth |
| 11,098,473 B1 | 8/2021 | Hylkema |
| 11,143,009 B1 | 10/2021 | Novak et al. |
| 11,371,777 B1 | 6/2022 | Loesch et al. |
| 2005/0011646 A1 | 1/2005 | Appleford et al. |
| 2010/0320133 A1 | 12/2010 | Page et al. |
| 2011/0265993 A1 | 11/2011 | Williams et al. |
| 2012/0012309 A1 | 1/2012 | Noles, Jr. |
| 2014/0311343 A1 | 10/2014 | Hendrix |
| 2015/0165358 A1 | 6/2015 | Hemstock et al. |
| 2015/0275601 A1 | 10/2015 | Munisteri |
| 2015/0292313 A1 | 10/2015 | Morin et al. |
| 2016/0030861 A1 | 2/2016 | Janssen et al. |
| 2016/0375386 A1 | 12/2016 | Magnus et al. |
| 2017/0101588 A1 | 4/2017 | Gonzalez et al. |
| 2018/0178151 A1 | 6/2018 | Murray, Sr. et al. |
| 2019/0106973 A1 | 4/2019 | Ayub et al. |
| 2019/0388809 A1 | 12/2019 | Rawls et al. |
| 2020/0048998 A1 | 2/2020 | Deroche |
| 2020/0072004 A1 | 3/2020 | Morin et al. |
| 2020/0114282 A1 | 4/2020 | Johnson |
| 2020/0122163 A1 | 4/2020 | Knorr et al. |
| 2020/0141221 A1 | 5/2020 | Malone et al. |
| 2020/0155968 A1 | 5/2020 | Stang |
| 2020/0156012 A1 | 5/2020 | Mortazavi et al. |
| 2020/0165908 A1 | 5/2020 | El-Mahbes et al. |
| 2020/0188817 A1 | 6/2020 | Spiridonov et al. |
| 2020/0215553 A1 | 7/2020 | Leonard |
| 2020/0217187 A1 | 7/2020 | Wang et al. |
| 2020/0256179 A1 | 8/2020 | Hari et al. |
| 2020/0256619 A1 | 8/2020 | Schnellbach et al. |
| 2020/0261836 A1 | 8/2020 | Chen et al. |
| 2020/0263688 A1 | 8/2020 | Correa et al. |
| 2020/0282338 A1 | 9/2020 | White et al. |
| 2020/0298151 A1 | 9/2020 | Nakano et al. |
| 2020/0308950 A1 | 10/2020 | Fires |
| 2020/0316617 A1 | 10/2020 | Gong et al. |
| 2020/0318477 A1 | 10/2020 | Pfeiffer et al. |
| 2020/0346140 A1 | 11/2020 | Soares Da Silva et al. |
| 2020/0369950 A1 | 11/2020 | Hill et al. |
| 2020/0378235 A1 | 12/2020 | Gonzales et al. |
| 2020/0392413 A1 | 12/2020 | Belanger |
| 2020/0399541 A1 | 12/2020 | Pringle et al. |
| 2021/0031134 A1 | 2/2021 | Bollom et al. |
| 2021/0077921 A1 | 3/2021 | Claxton et al. |
| 2021/0086104 A1 | 3/2021 | Park et al. |
| 2021/0086107 A1 | 3/2021 | Ball, IV |
| 2021/0093984 A1 | 4/2021 | Macartney |
| 2021/0108498 A1 | 4/2021 | Marshall |
| 2021/0121801 A1 | 4/2021 | Lecornu et al. |
| 2021/0138362 A1 | 5/2021 | Ohnson |
| 2021/0138369 A1 | 5/2021 | Wu |
| 2021/0146280 A1 | 5/2021 | Che Daud et al. |
| 2021/0154601 A1 | 5/2021 | Johnston et al. |
| 2021/0213374 A1 | 7/2021 | Ball, IV |
| 2021/0213451 A1 | 7/2021 | Shkolnikov et al. |
| 2021/0252431 A1 | 8/2021 | Malone et al. |
| 2021/0260498 A1 | 8/2021 | Olschok et al. |
| 2021/0291086 A1 | 9/2021 | Bingham |
| 2021/0308605 A1 | 10/2021 | Shimada et al. |
| 2021/0316233 A1 | 10/2021 | Kumkrong et al. |
| 2021/0324722 A1 | 10/2021 | Xiao et al. |
| 2021/0332195 A1 | 10/2021 | Wang et al. |
| 2021/0379511 A1 | 12/2021 | Scott et al. |
| 2021/0387112 A1 | 12/2021 | Larin et al. |
| 2022/0010633 A1 | 1/2022 | Posa |
| 2022/0010664 A1 | 1/2022 | MacPhail et al. |
| 2022/0025722 A1 | 1/2022 | Lymberopoulos et al. |
| 2022/0041971 A1 | 2/2022 | Hatanaka et al. |
| 2022/0073370 A1 | 3/2022 | Dayak et al. |
| 2022/0073375 A1 | 3/2022 | Smiddy et al. |
| 2022/0126306 A1 | 4/2022 | Moore et al. |
| 2022/0143625 A1 | 5/2022 | Matthiasson et al. |
| 2022/0144677 A1 | 5/2022 | Kent et al. |
| 2022/0145654 A1 | 5/2022 | Hayes et al. |
| 2022/0154557 A1 | 5/2022 | Erives et al. |
| 2022/0162135 A1 | 5/2022 | Bewley, Jr. |
| 2022/0184545 A1 | 6/2022 | Higgins |
| 2022/0203273 A1 | 6/2022 | Wu |

(56) References Cited

U.S. PATENT DOCUMENTS

| | | | |
|---|---|---|---|
| 2022/0203381 A1 | 6/2022 | Prast et al. | |
| 2022/0205347 A1 | 6/2022 | Tang et al. | |
| 2022/0212233 A1 | 7/2022 | Hol et al. | |

FOREIGN PATENT DOCUMENTS

| | | | |
|---|---|---|---|
| CA | 2 873 355 C | 6/2015 | |
| CA | 2 933 497 A1 | 6/2015 | |
| CN | 2207444 Y | 9/1995 | |
| CN | 2338072 Y | 9/1999 | |
| CN | 2392586 Y | 8/2000 | |
| CN | 2559790 Y | 7/2003 | |
| CN | 2930824 Y | 8/2007 | |
| CN | 201129171 Y | 10/2008 | |
| CN | 201212385 Y | 3/2009 | |
| CN | 201241684 Y | 5/2009 | |
| CN | 201908642 U | 7/2011 | |
| CN | 202538429 U | 11/2012 | |
| CN | 202882875 U | 4/2013 | |
| CN | 202892984 U | 4/2013 | |
| CN | 203879480 U | 10/2014 | |
| CN | 204920932 U | 12/2015 | |
| CN | 104594874 B | 1/2018 | |
| EP | 2 456 531 B1 | 8/2013 | |
| EP | 2 758 144 B1 | 3/2017 | |
| GB | 2287667 A | * | 9/1995 |
| RU | 2 039 228 C1 | 7/1995 | |
| WO | 96/09895 A1 | 4/1996 | |
| WO | 01/28659 A1 | 4/2001 | |
| WO | 2005/005012 A1 | 1/2005 | |
| WO | 2015/093935 A1 | 6/2015 | |
| WO | 2015/154160 A1 | 10/2015 | |
| WO | 2017/080936 A1 | 5/2017 | |

* cited by examiner

COUNTERFLOW VORTEX BREAKER

BACKGROUND

Technical Field

This relates to a vortex breaker for use in a particulate separator vessel, and in particular, a vortex breaker that improves the separation of solids from a fluid stream.

Description of the Related Art

In separation vessels that separate solids from fluid flow, particulate matter is generally collected at the bottom. In the oil and gas industry, where these types of separators are commonly used, the particulate matter is generally referred to as sand.

When the separation vessel is a cylindrical or spherical vessel, the fluid has a tendency to rotate in the direction of flow. This rotation may be induced intentionally, as a means for assisting the separation of the various phases. However, rotation of fluid at the bottom of the tank, sometimes referred to as a vortex, is often not desirable as it makes it more difficult for sand to settle and can make it more difficult to drain the tank. Because of this, vortex breakers are often used to reduce the rotation of fluid at the bottom of a tank. U.S. Pat. No. 2,917,131 (Evans) entitled "Cyclone Separator" describes a vortex breaker that has vanes oriented radially with respect to the fluid flow.

BRIEF SUMMARY

According to an aspect, there is provided a vortex breaker for a particulate separator. The particulate separator comprises a vessel having an inner wall, an inlet, a first outlet, and a second outlet adjacent to a bottom of the vessel. The vortex breaker comprises a first set of vanes spaced along a perimeter of a first shape, a second set of vanes spaced along a perimeter of a second shape, the perimeter of the second shape residing within the perimeter of the first shape, and a vertical axis positioned within the perimeter of the second shape. Each of the vanes in the first set of vanes and the second set of vanes has a top edge, a bottom edge, an inside edge, and an outside edge. Each of the vanes in the first set of vanes intersects the perimeter of the first shape with the outside edge spaced outward and in a first rotational direction about the vertical axis relative to the inside edge. Each of the vanes in the second set of vanes intersects the perimeter of the second shape with the outside edge is spaced outward and in a second rotational direction about the vertical axis relative to the inside edge, the second rotational direction being opposite the first rotational direction. The first set of vanes and the second set of vanes define fluid flow paths between the outside edges of the vanes in the first set of vanes and the inside edges of the vanes in the second set of vanes.

According to other aspects, the vortex breaker may comprise one or more of the following features, alone or in combination: one or more additional sets of vanes may be spaced along one or more perimeters of one or more additional shapes that reside within the perimeter of the second shape; the first and second sets of vanes may each comprise three or more vanes; each vane may comprise a radius of curvature between the inside edge and the outside edge; the radius of curvature of the vanes in the first set of vanes may be in the direction of the first rotational direction, and the radius of curvature of the vanes in the second set of vanes may be in the direction of the second rotational direction; the perimeters of the first and second shapes may define concentric circles that surround a vertical axis of the vessel; the bottom edges of the vanes in at least the second set of vanes may define openings between the vanes and the inner wall of the vessel; the top edges of the vanes in at least one of the first and second sets of vanes may be spaced inward or outward from the bottom edges relative to the vertical axis of the vessel; the first and second sets of vanes may be axially symmetric about the vertical axis; the vortex breaker may further comprise a laterally-oriented baffle that overlies the vertical axis at a point above the bottom edges of the vanes in the second set of vanes; the inner edges of the vanes in the second set of vanes may be connected together; and the vortex breaker may further comprise one or more flow barriers connected between adjacent vanes of the first set of vanes or the second set of vanes.

According to an aspect, there is provided a vortex breaker for a particulate separator. The particulate separator comprises a vessel having an inner wall, an inlet, a first outlet, and a second outlet adjacent to a bottom of the vessel. The vortex breaker comprises a first set of vanes spaced along a perimeter of a first shape, a second set of vanes spaced along a perimeter of a second shape, the perimeter of the second shape residing within the perimeter of the first shape, and a vertical axis positioned within the perimeter of the second shape. Each of the vanes in the first set of vanes and the second set of vanes has a top edge, a bottom edge, an inside edge, and an outside edge, the outside edge being spaced outward relative to the inside edge. Each of the vanes in the first set of vanes are spaced in a first rotational direction about the vertical axis relative to the inside edge. The first set of vanes and the second set of vanes define fluid flow paths between the outside edges of the vanes in the first set of vanes and the inside edges of the vanes in the second set of vanes.

According to another aspect, the inner edges of the vanes in the second set of vanes may extend radially outward from the vertical axis.

According to an aspect, there is provided a particulate separator. The particulate separator comprises a vessel having an inner wall, an inlet, a first outlet, and a second outlet adjacent to a bottom of the vessel and a vortex breaker within the vessel. The vortex breaker comprises a first set of vanes spaced along a perimeter of a first shape, a second set of vanes spaced along a perimeter of a second shape, the perimeter of the second shape residing within the perimeter of the first shape, and a vertical axis positioned within the perimeter of the second shape. Each of the vanes in the first set of vanes and the second set of vanes has a top edge, a bottom edge, an inside edge, and an outside edge. Each of the vanes in the first set of vanes intersects the perimeter of the first shape with the outside edge spaced outward and in a first rotational direction about the vertical axis relative to the inside edge. Each of the vanes in the second set of vanes intersects the perimeter of the second shape with the outside edge spaced outward and in a second rotational direction about the vertical axis relative to the inside edge, the second rotational direction being opposite the first rotational direction. The first set of vanes and the second set of vanes define fluid flow paths between the outside edges of the vanes in the first set of vanes and the inside edges of the vanes in the second set of vanes.

According to other aspects, the particulate separator may comprise one or more of the following features, alone or in combination: there may be an internal structure positioned within the vessel and adjacent to the inlet that induces particulates to separate from an inlet stream of fluid, the internal structure may be vertically above the vortex breaker within the vessel, and the internal structure may induce the inlet stream of fluid to rotate in the first rotational direction; at least one of the first and second sets of vanes may extend between the bottom of the vessel and the internal structure; the at least one of the first and second set of vanes may extend into the internal structure; a flow passage may be defined between the top edges of the vanes in the at least one of the first and second set of vanes and the internal structure; the first outlet may be positioned at or below the top edges of the vanes of one or both the first and second sets of vanes; one or more additional sets of vanes may be spaced along one or more perimeters of one or more additional shapes that reside within the perimeter of the second shape; the first and second sets of vanes may each comprise three or more vanes; each vane may comprise a radius of curvature between the inside edge and the outside edge; the vanes in each set of vanes may have a radius of curvature in the same direction; the radius of curvature of the vanes in the first set of vanes may be in the direction of the first rotational direction, and the radius of curvature of the vanes in the second set of vanes may be in the direction of the second rotational direction; the perimeters of the first and second shapes may define concentric circles that surround a vertical axis of the vessel; the bottom edges of the vanes in at least the second set of vanes may define openings between the vanes and the inner wall of the vessel; the top edges of the vanes in at least one of the first and second sets of vanes may be spaced inward or outward from the bottom edges relative to the vertical axis of the vessel; the first and second sets of vanes may be rotationally symmetric; and one or more flow barriers may be connected between adjacent vanes in the first set of vanes of the second set of vanes.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
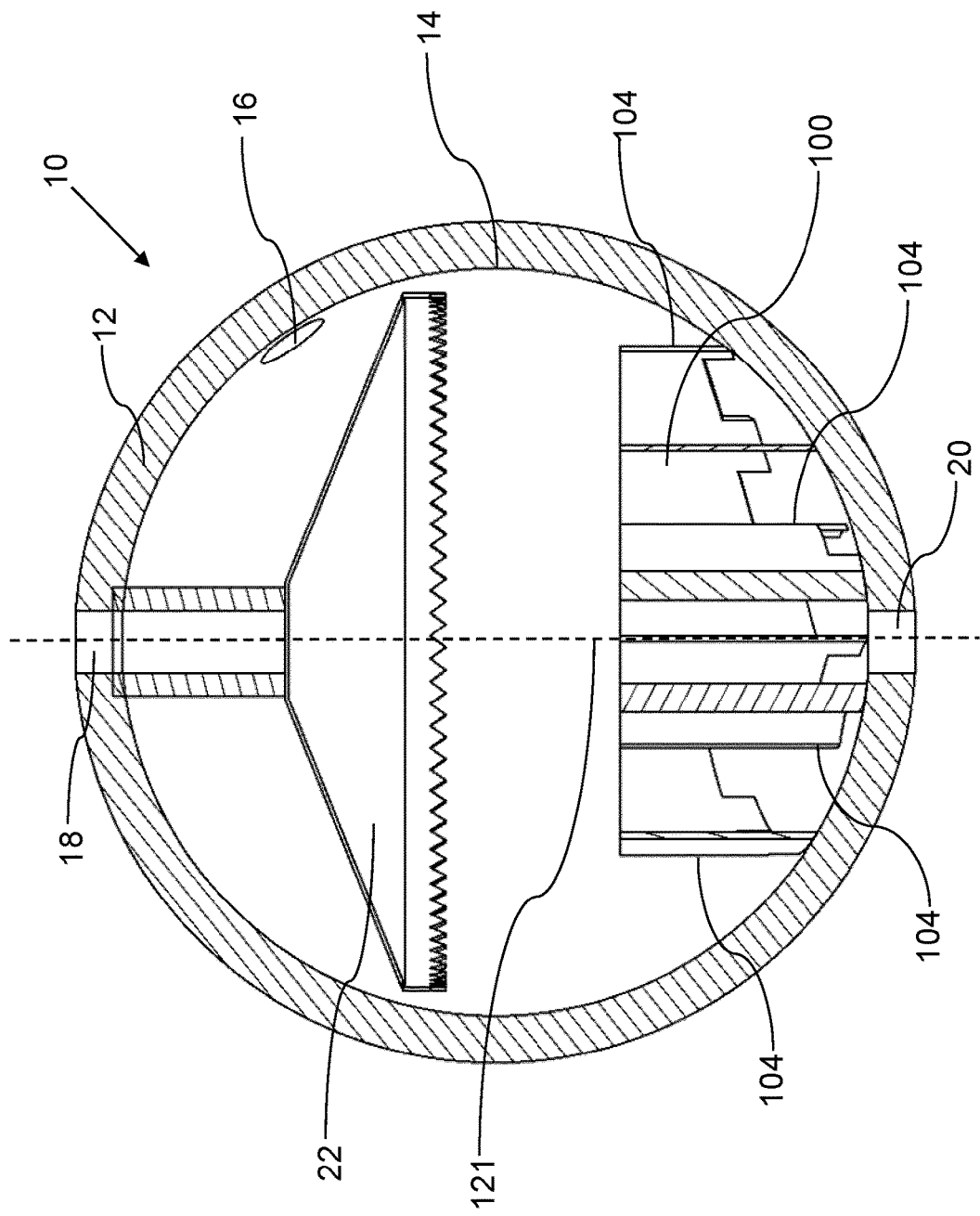
FIG. 1 is an elevated side view of a particulate separator.

A vortex breaker, generally identified by reference numeral 100, and alternatives thereof will now be described with reference to FIGS. 1 through 20. In this description, vortex breaker 100 is described in the context of a particulate separator vessel (generally indicated by reference numeral 10) that is used to separate particulate from a stream of fluid and collect the particulate at the bottom. It will be understood that vortex breaker 100 may also be used in other separators than the one described herein.

Figure 11:
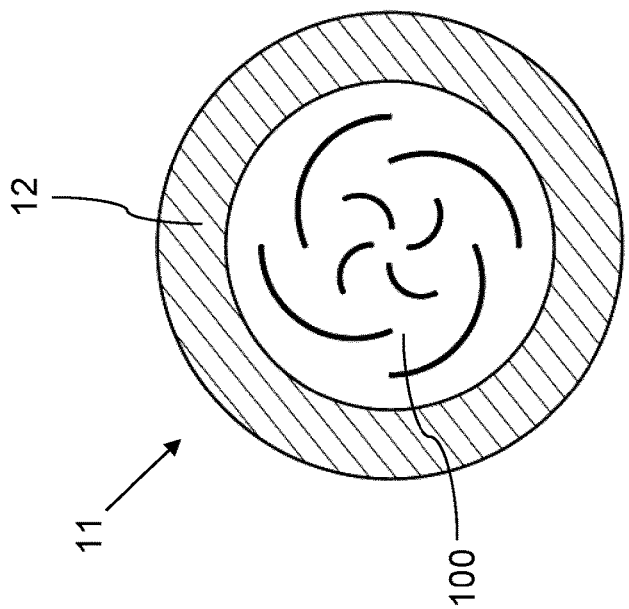
FIG. 11 is a top plan view of a vortex breaker inside of a cylindrically-shaped particulate separator.
Figure 10:
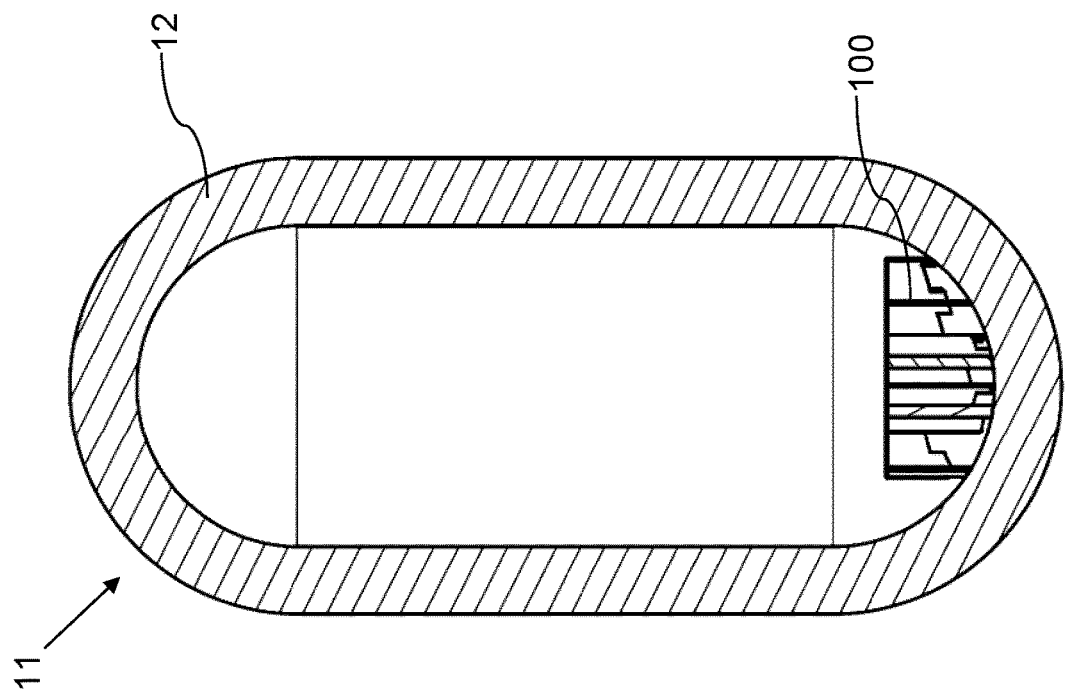
FIG. 10 is a side elevation view of a cylindrically-shaped particulate separator.
Figure 20:
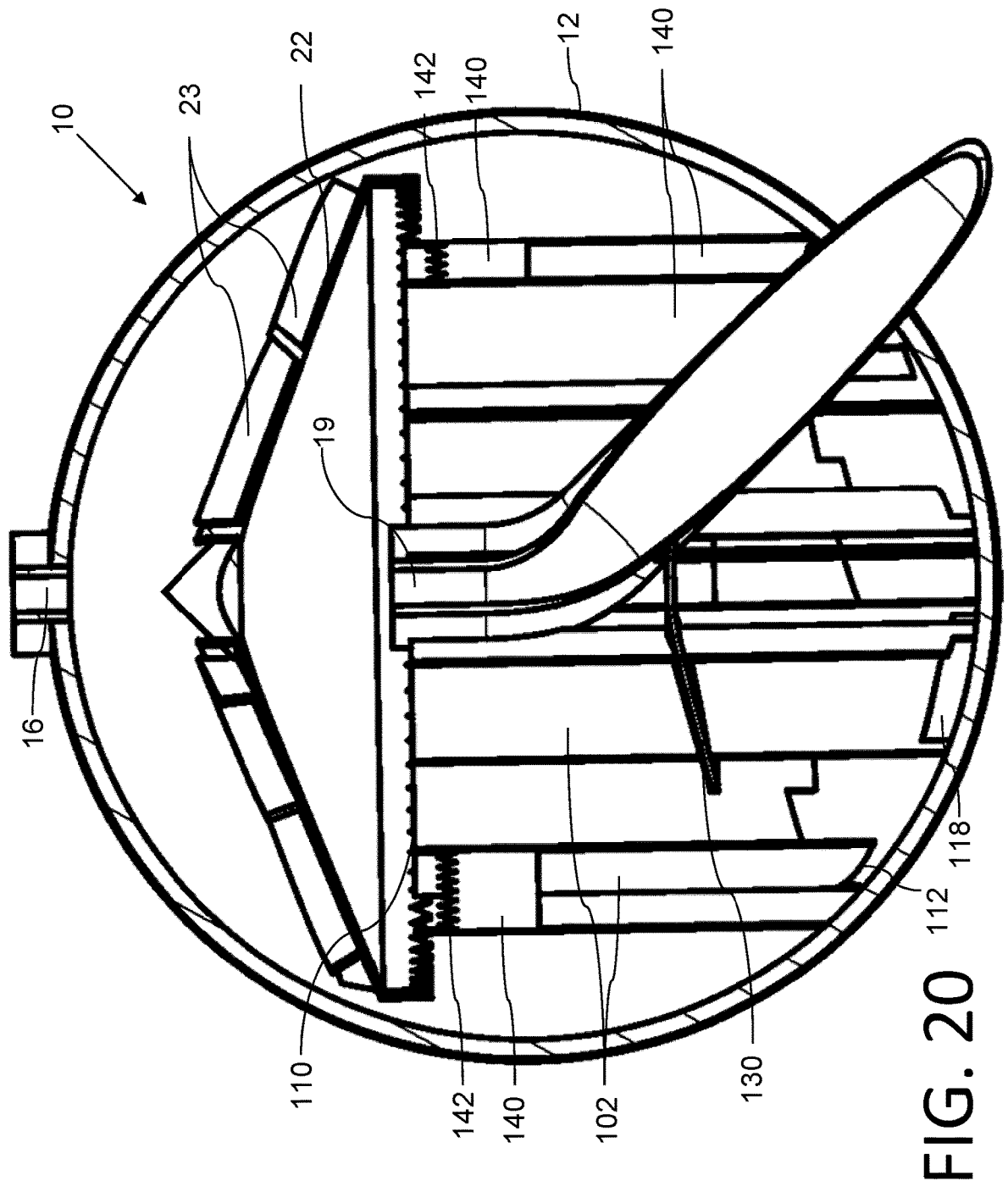
FIG. 20 is an elevated side view in cross section of a separator with a central outlet, and incorporating the vortex breaker of FIG. 17.

Referring to FIG. 1, vortex breaker 100 is shown as an element in sand separator 10. Sand separator 10 has a vessel 12 with an inner wall 14 and at least three openings: an inlet 16, generally at the top of vessel 12 where multiphase fluid enters the vessel, a first outlet 18 where fluid exits vessel 12, and a second outlet 20, generally positioned at the bottom of the vessel 12 where sand collects. In this document, "sand" is used to refer to any solid particulate matter that may be entrained by, and to be separated from, a fluid stream in separator 10. In the oil and gas industry, this material is referred to generally as "sand," regardless of its actual chemical makeup. Inlet 16 is shown at the top of vessel 12, although it may be at any convenient location, such as the side, depending on the separation strategy being used in vessel 12. First outlet 18 and second outlet 20 are used to remove different components of the inlet flow after separation has occurred, and positioned at a convenient location to ensure maximum separation. For example, if sand is being separated from a stream of gas or liquid, or both, second outlet 20 will be at or toward the bottom of vessel 12, while first outlet 18 will be above second outlet 20. In the depicted example, liquid and gas exit vessel 12 via first outlet 18, as vessel 12 is intended to be used to separate sand from the liquid and gas phases. In other types of separators, there may also be additional inlets or outlets, or the inlets and outlets may be reposition, as required. For example, if the separator were used to separate gas, liquid, and sand from a three phase fluid flow, there may be three different outlets. If the separator were designed to further separate water and liquid hydrocarbons from the liquid phase, there may be four outlets. In addition, the actual point at which the components are introduced or removed may be varied through the use of a piping that extends into vessel 12. While not shown, it is common for separator vessels to have additional baffles and barriers. Examples of internal structures that may be used can be found in U.S. Pat. No. 9,089,792 (Zylla) entitled "Multi-phase flow separation apparatus and system," and U.S. Pat. No. 7,785,400 (Worley) entitled "Spherical Sand Separators." The internal structures will depend on various factors, such as the type of inlet fluid, the components being separated, the pressures and flow rates of the inlet fluid, etc., and will not be discussed further. However, vortex breaker 100 is particularly useful to reduce the swirling action, or vortex, which may occur at the bottom of a tank with an internal cross-section at the bottom that is round, such as may be found in a spherical tank, or a vertically-oriented cylindrical vessel. By way of illustration only, vortex breaker 100 is shown in an example of a sand separator 10 that has a hood 22 positioned underneath inlet 16 near the top of vessel 12. When fluid enters vessel 12, it encounters the apex of hood 22 and is directed towards inner wall 14. Hood 22 may include spiral ridges 23, as shown in FIG. 20, on its upper surface to rotate the fluid as it flows towards inner wall 14. The separation of components occurs as fluid is redirected by and around hood 22 and other baffles or barriers that may be present. The fluid movement within vessel 12 generally causes a vortex towards the bottom of the vessel. While vessel 12 is shown as spherical, the type of internal structures shown may also be used in other types of vessel, such as a vertically-oriented cylindrical vessel 11 as depicted in FIGS. 10 and 11. It will be understood that vortex breaker 100 described herein may be used with any suitable internal structure where sand is to be separated at the bottom of vessel 12.

Figure 2:
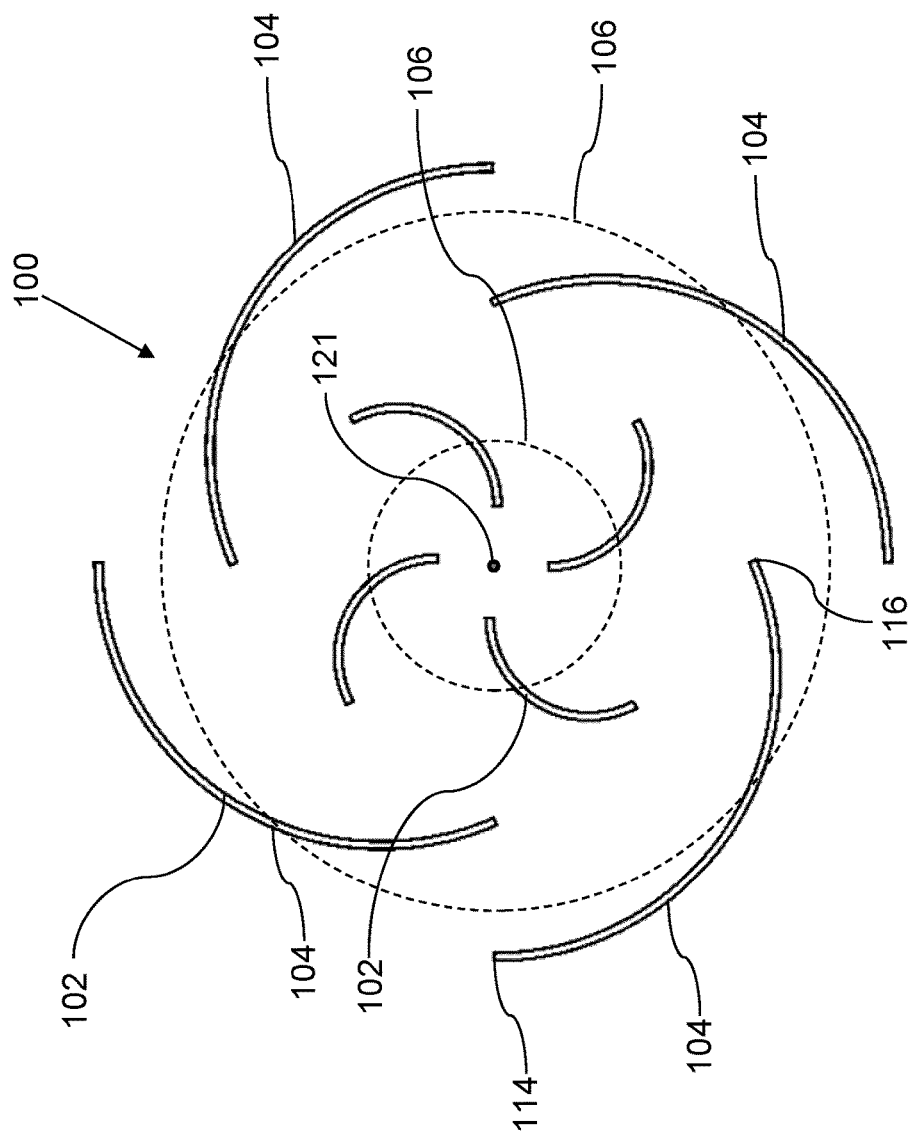
FIG. 2 is a top plan view of a vortex breaker.
Figure 9:
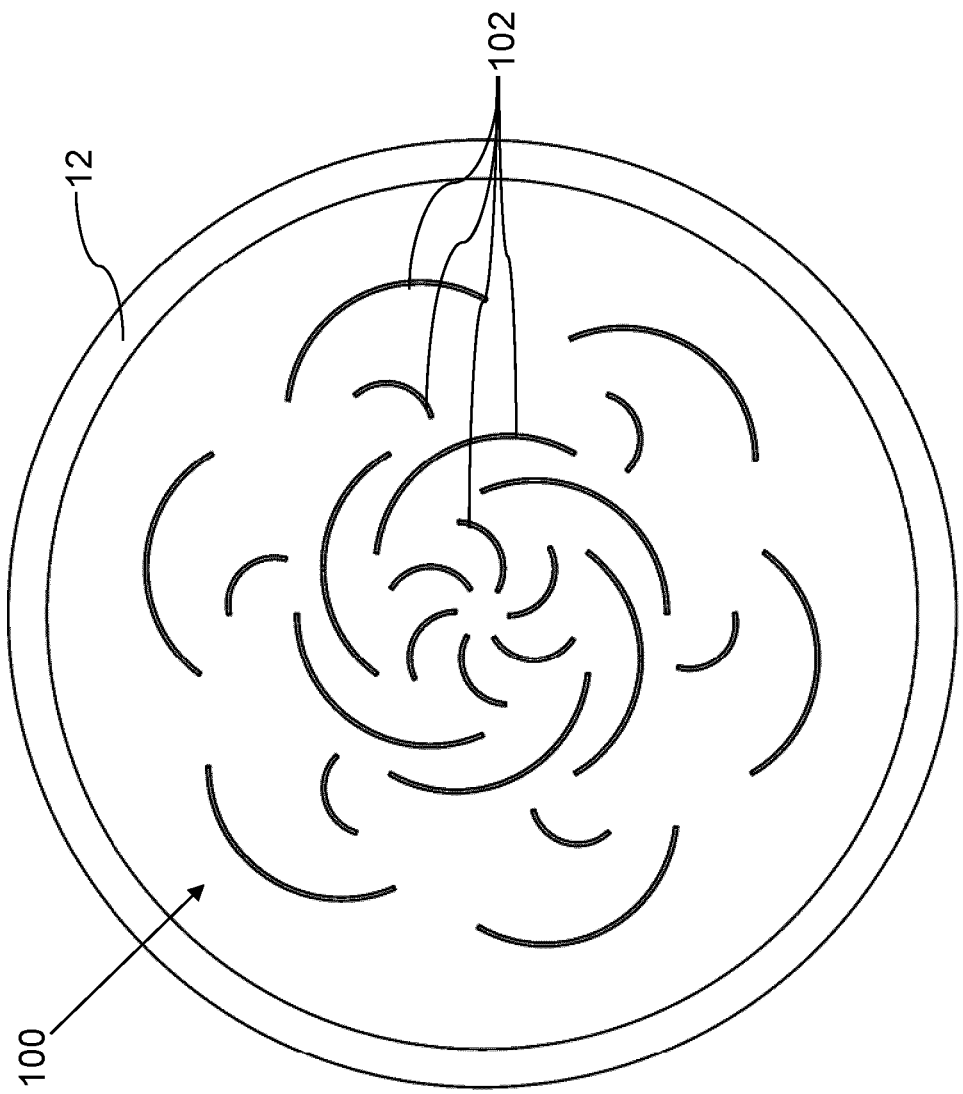
FIG. 9 is a top plan view of a vortex breaker with additional sets of vanes.

It has been found that, by controlling the flow of fluid using vortex breaker 100, it is possible to increase the amount of sand that falls out of the liquid and increase sand retention at the bottom of vessel, particularly at higher fluid flow rates where retention becomes more difficult. Referring to FIG. 1, vortex breaker 100 is generally positioned near the bottom of vessel 12, near second outlet 20. Vortex breaker 100 has a plurality of vane sets 102 nested within each other, and each set of vanes 102 is made up of a plurality of vanes 104. As will be discussed herein, there may be any number of vanes 104 that make vane set 102, and any number of vane sets 102, that make up vortex breaker 100. Vortex breaker 100 depicted in FIG. 2 has two sets of vanes 102, with four vanes 104 in each set 102. FIG. 9 depicts another example of vortex breaker 100 having four vane sets 102, where each set 102 has six vanes 104. Each set of vanes 102 is spaced along a perimeter 106 that defines a shape. Perimeter 106 as depicted in FIG. 2 is a circle, which presents a symmetrical pattern that follows the natural flow path of a vortex, however other shapes that result in a desired flow pattern may also be used. Vanes 104 are spaced around vane set perimeter 106. Each vane 104 will typically be positioned such that it intersects vane set perimeter 106 only one time, or lies along a section of vane set perimeter 106. Typically, vanes 104 will intersect only one vane set perimeter 106 that defines the set of vanes 102 it belongs to. A second set of vanes 102 that is nested within a first set of vanes 102 may have the vane set perimeter 106 defining the second set within the perimeter defining the first set. Vanes 104 within a set of vanes 102 or vanes 104 in two different sets of vanes 102 may be in contact with or coupled to one another, as long as the desired flow paths are not unduly interrupted or impeded.

Figure 3:
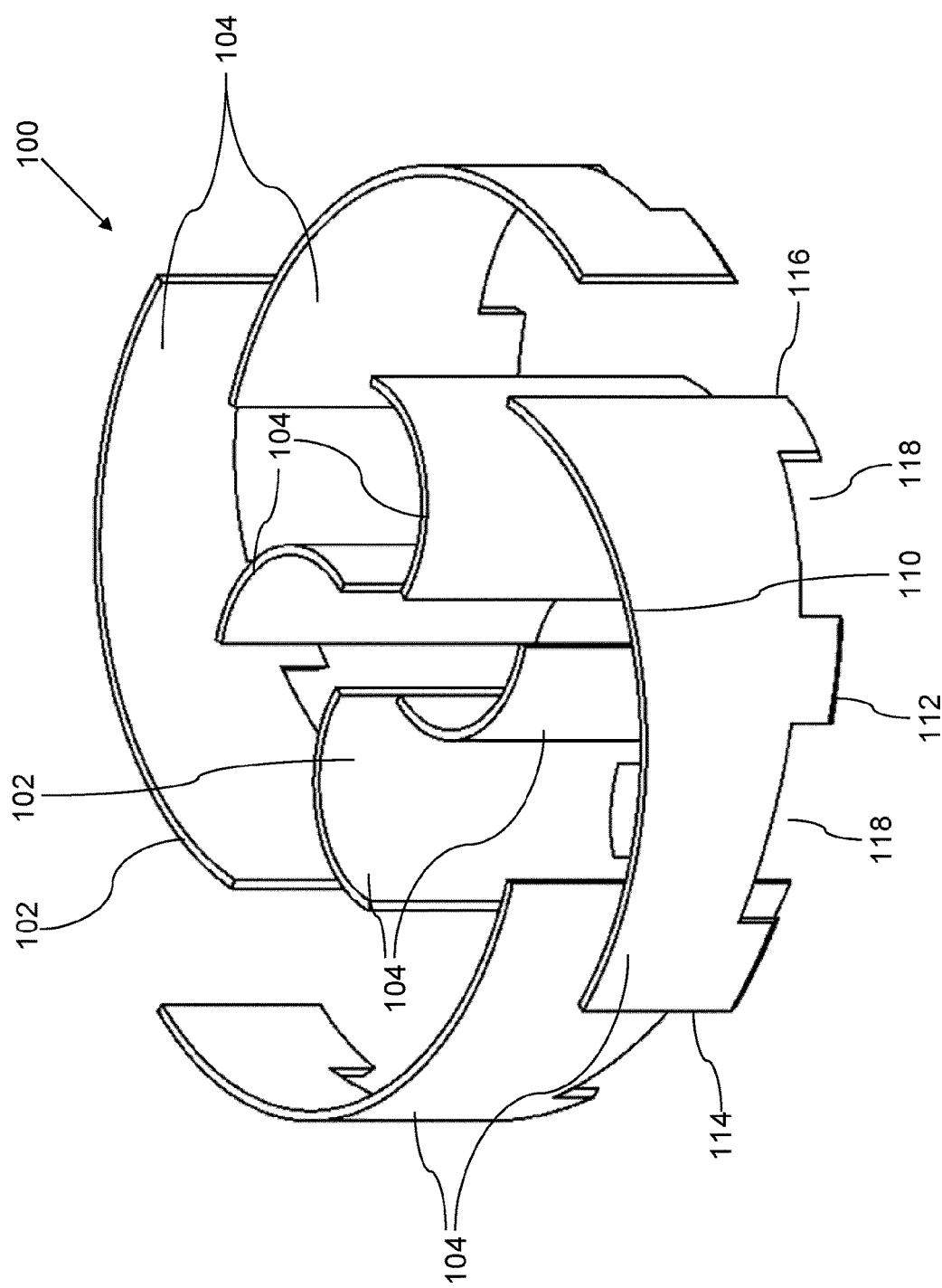
FIG. 3 is a perspective view of a vortex breaker.
Figure 4:
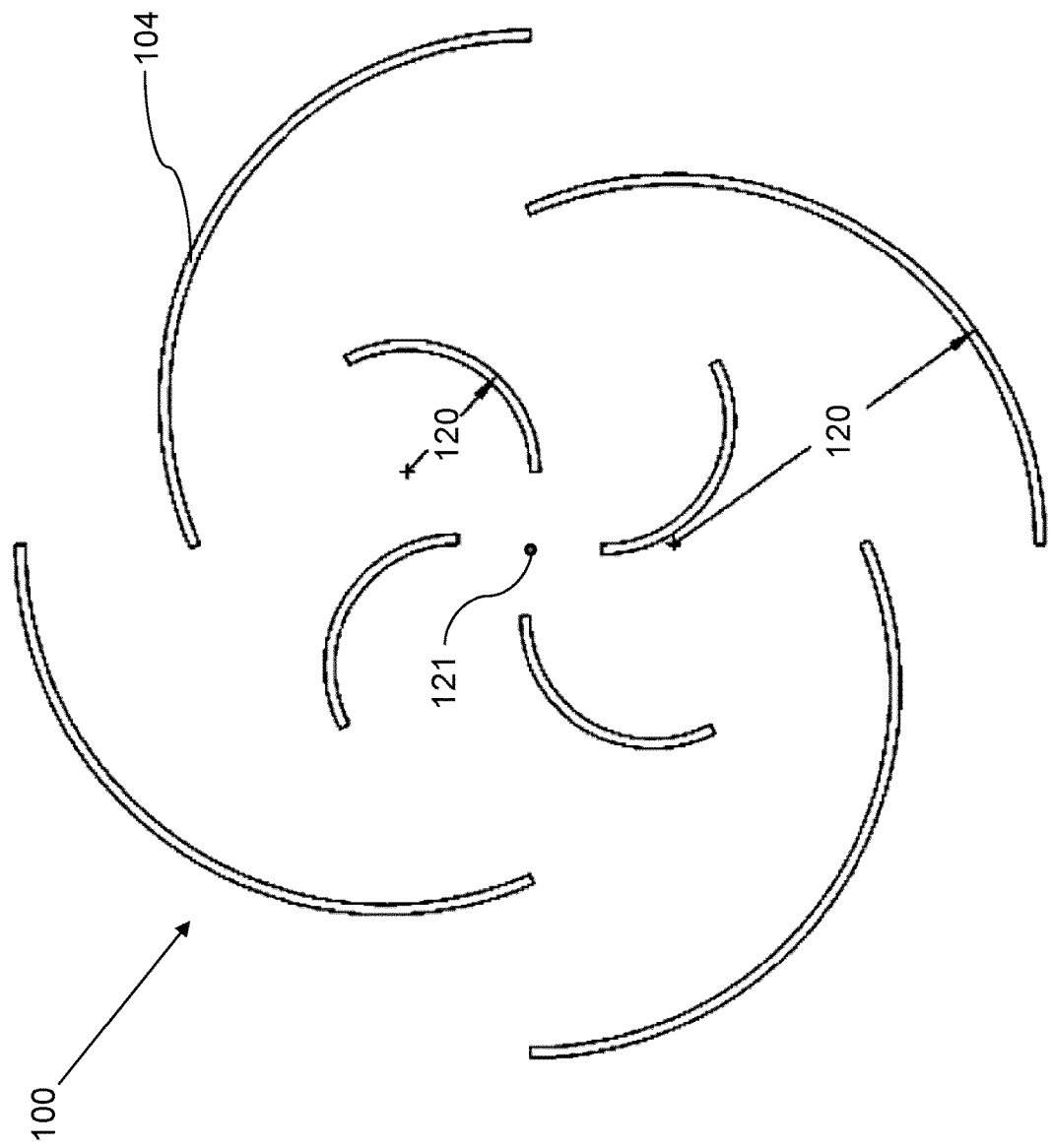
FIG. 4 is a top plan view of a vortex breaker showing the radius of curvature of the vanes.
Figure 5:
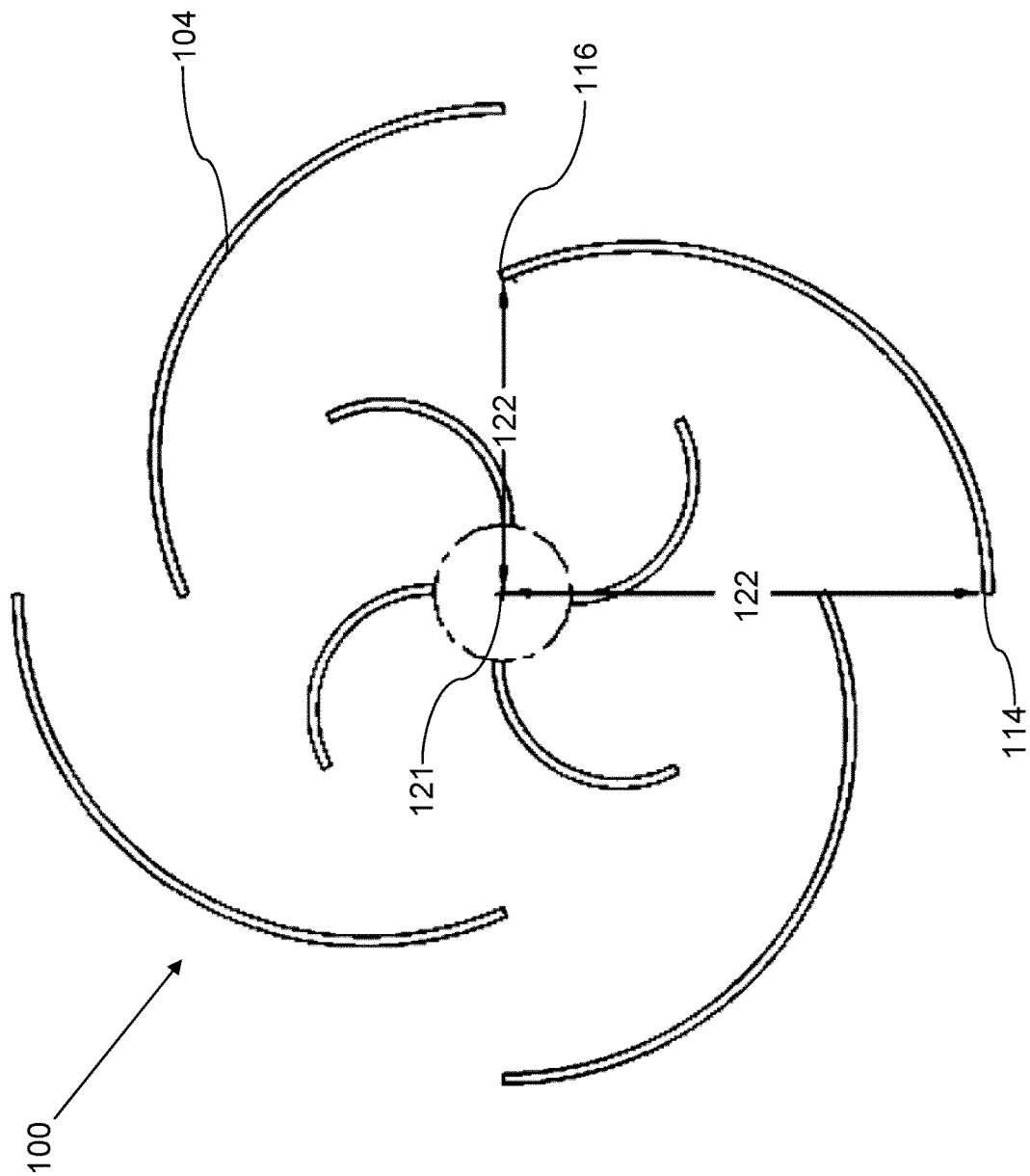
FIG. 5 is a top plan view of a vortex breaker showing the radius of the edges.
Figure 6:
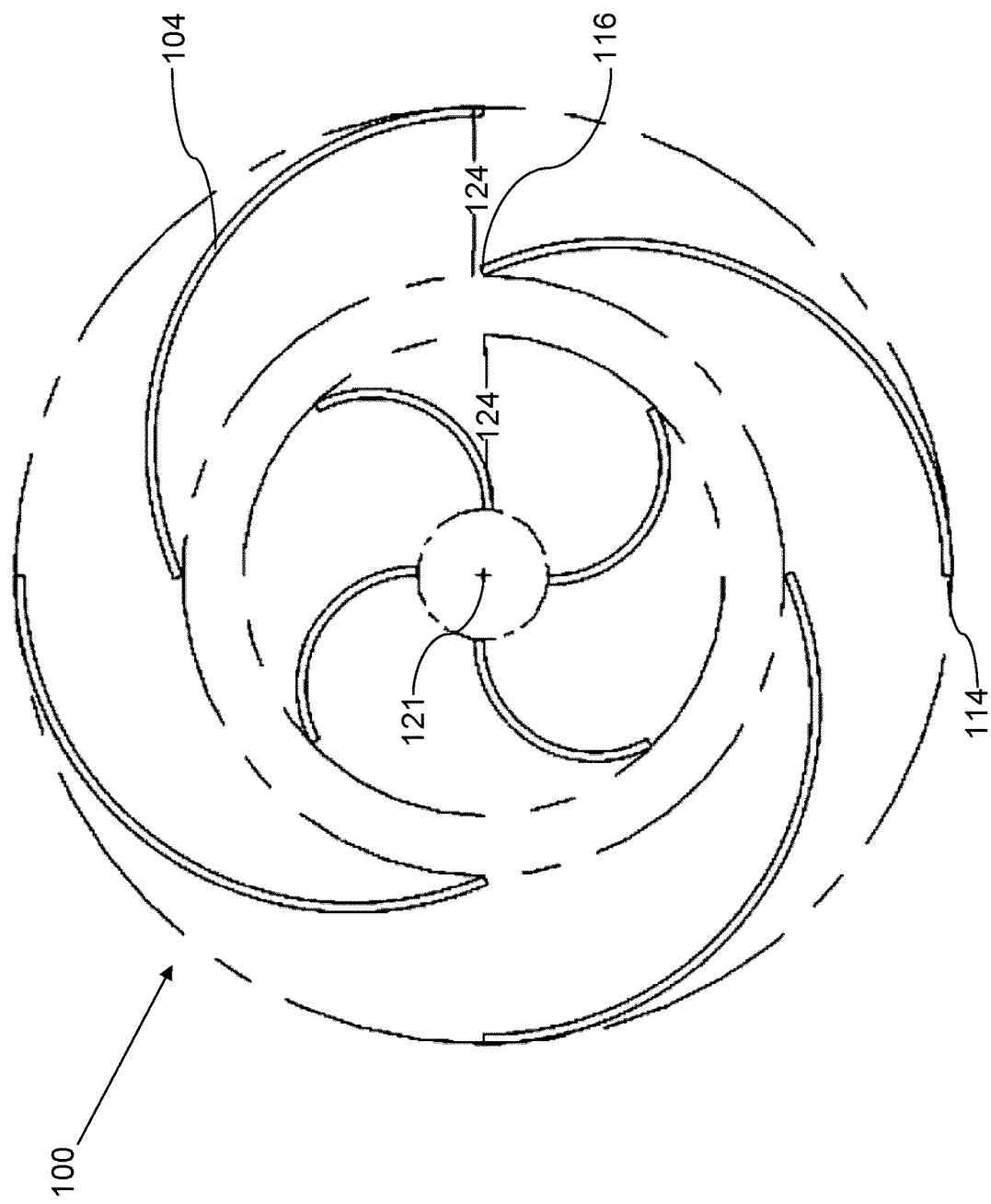
FIG. 6 is a top plan view of a vortex breaker showing the radial travel distance.
Figure 7:
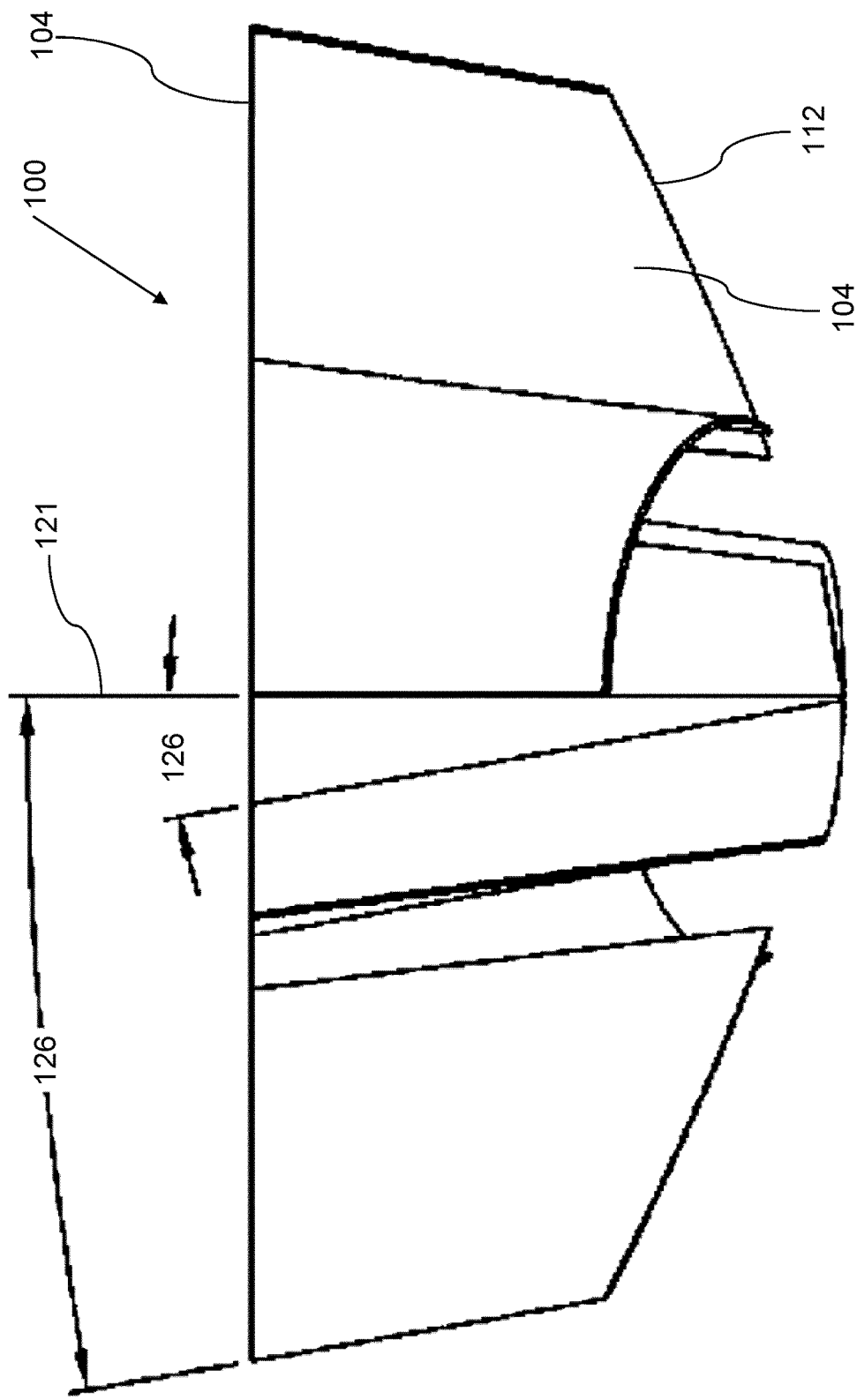
FIG. 7 is a side elevation view of a vortex breaker showing the angle of spread of the vanes.
Figure 8:
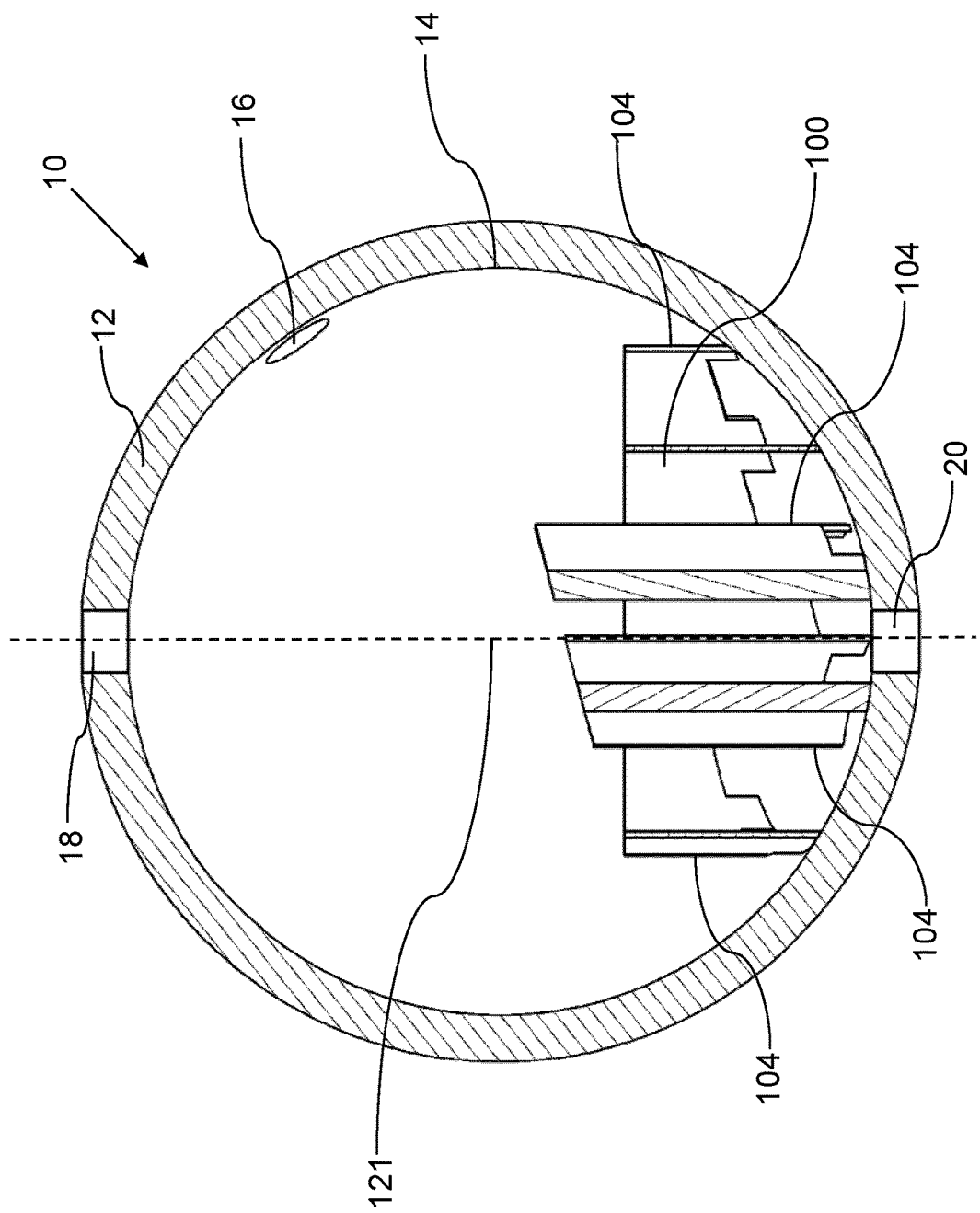
FIG. 8 is a side elevation view of an alternative particulate separator.

An example of a vane is shown in FIG. 3, where each vane 104 has a top edge 110, a bottom edge 112, a first, or outside, edge 114, and a second, or inside, edge 116. Vanes 104 are affixed to the vessel along bottom edge 112 and also include sand openings 118 towards bottom edge 112. Each vane 104 may be curved such that it has a specific radius of curvature. The radius of curvature is defined to be in either a clockwise direction, or a counter-clockwise direction relative to a vertical axis 121 of vessel 12. The radius of curvature is specified to be oriented in a clockwise direction when it has its concave side oriented towards a clockwise direction with respect to set perimeter 106. Vanes 104 may also be straight and have an infinite radius of curvature. In FIGS. 2 and 3, a relatively simple configuration is shown in which vanes 104 in the outer set of vanes 102 are all oriented in a clockwise direction and vanes 104 in the inner set of vanes 102 are all oriented in a counter-clockwise direction. It will be understood that the actual configuration may be more complex, and that various design factors may be used. In some examples, vanes 104 may also be angled relative to axis 121 perpendicular to vane set perimeter 106; the vanes 104 in a set of vanes 102 may have a radius of curvature oriented in the same direction although they may be oriented in different directions; vanes may be angled out or in relative to a vertical axis 121 of vessel 12; the vanes may have a thickness that varies top edge 110 to bottom edge 112, or from outside edge 114 to inside edge 116, and any of the edges may have a varying profile along their length, etc. As represented by FIG. 9, the spacing and orientation of vanes 104 and sets 102 of vanes may vary, depending on the preferences of the user. In another example, referring to FIG. 8, top edge 110 of vanes 104 in inner set of vanes 102 are profiled to present a diagonal line that extends up from left to right, while the outer set of vanes 104 remains horizontal. Other profiles and shapes for top edges 110 may be used to enhance the separation of sand from the fluid flow.

We will now describe various embodiments of vortex breaker 100, with reference to FIGS. 4-8, and the usual range of parameter used during operation of the embodiment. In these embodiments, it is assumed that the flow of fluid generally descends toward the outside of vessel 12 in a counter-clockwise direction when looking down axis 121 as in the depicted views, interacts with of vanes 102, and moves upward toward the center of vessel 12. It will be understood that, given the nature of separator 10, the flow can only be described in general terms as the flow at an given instant will not be uniform or constant, and there will be some chaotic flow, in part due to vanes 102. In these embodiments, sets of vanes 102 are spaced along perimeters 106 that are concentric circles centered on the central axis 121 of a spherical vessel 12. There may be between two and six sets of vanes 102 and between three and sixteen vanes 104 in each set of vanes 102. The vanes 104 in each set of vanes 102 are oriented in the same direction; however a first set of vanes 102 may have vanes 104 that are oriented in a direction different than those in a second set of vanes 102. The vanes of the depicted embodiment may have a varying radius of curvature 120 up to infinity at which point the vanes are straight between outside edge 114 and inside edge 116. Depending on the vessel and the vanes, the radius may be as small as one inch. Radius of curvature 120 between vanes 104 on the same set of vanes 102 are generally the same however they may be different. Additionally, vanes 104 in different sets of vanes 102 are shown as having different radii of curvature 120; however they may be the same.

Figure 16:
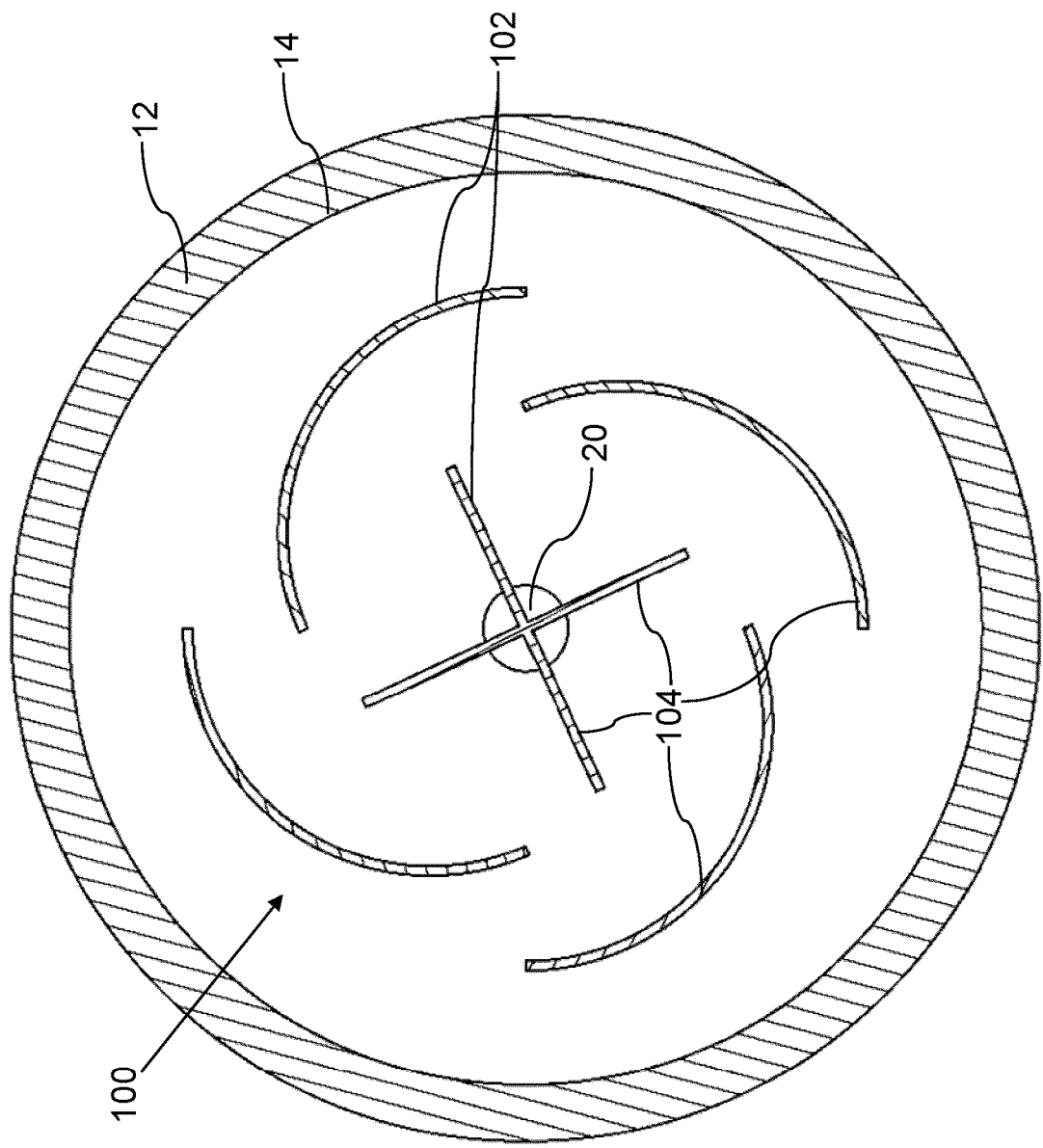
FIG. 16 is a top plan view in section of a further alternative of a particulate separator with planar baffles.
Figure 17:
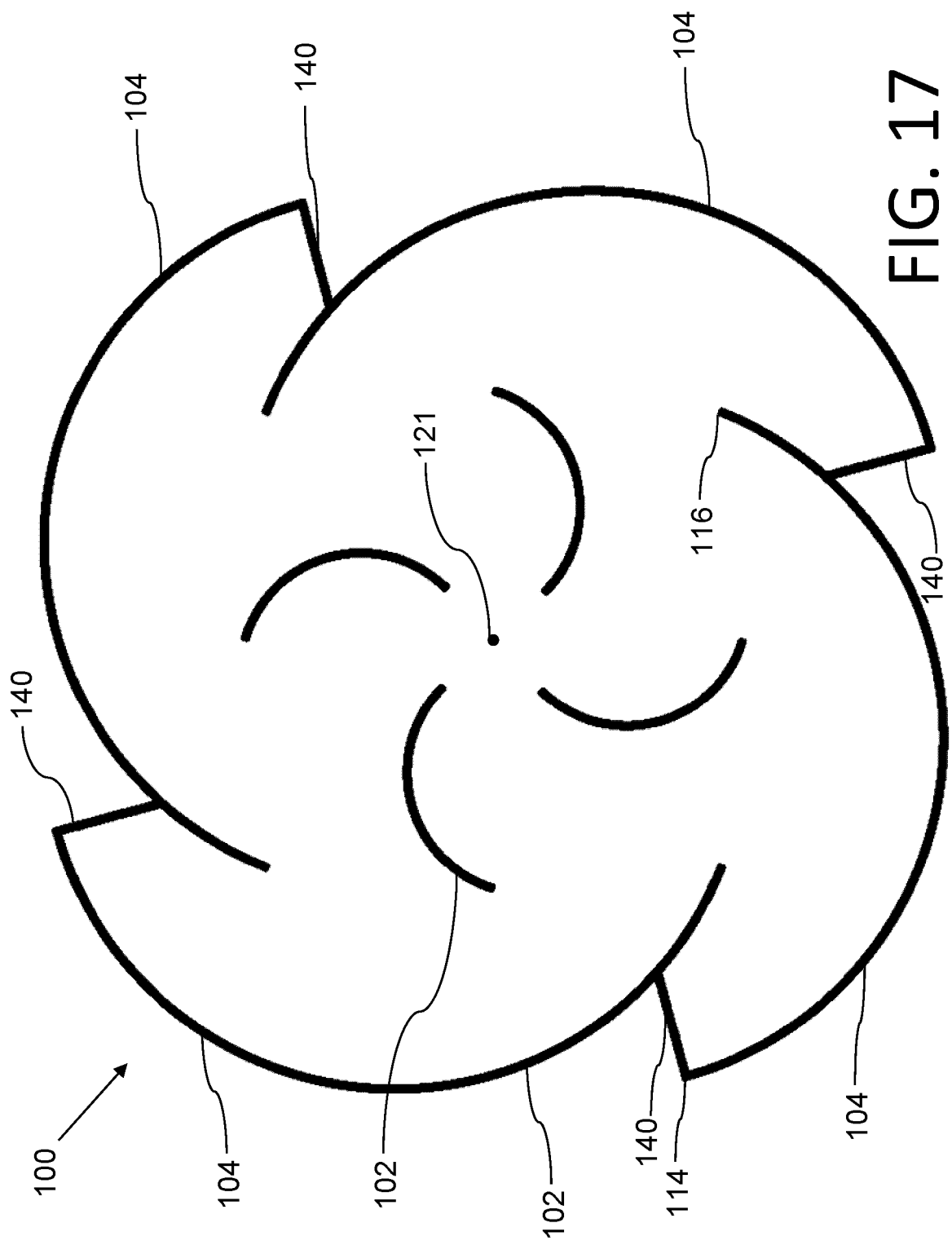
FIG. 17 is a top plan view of an alternative vortex breaker with flow barriers between outer vanes.
Figure 18:
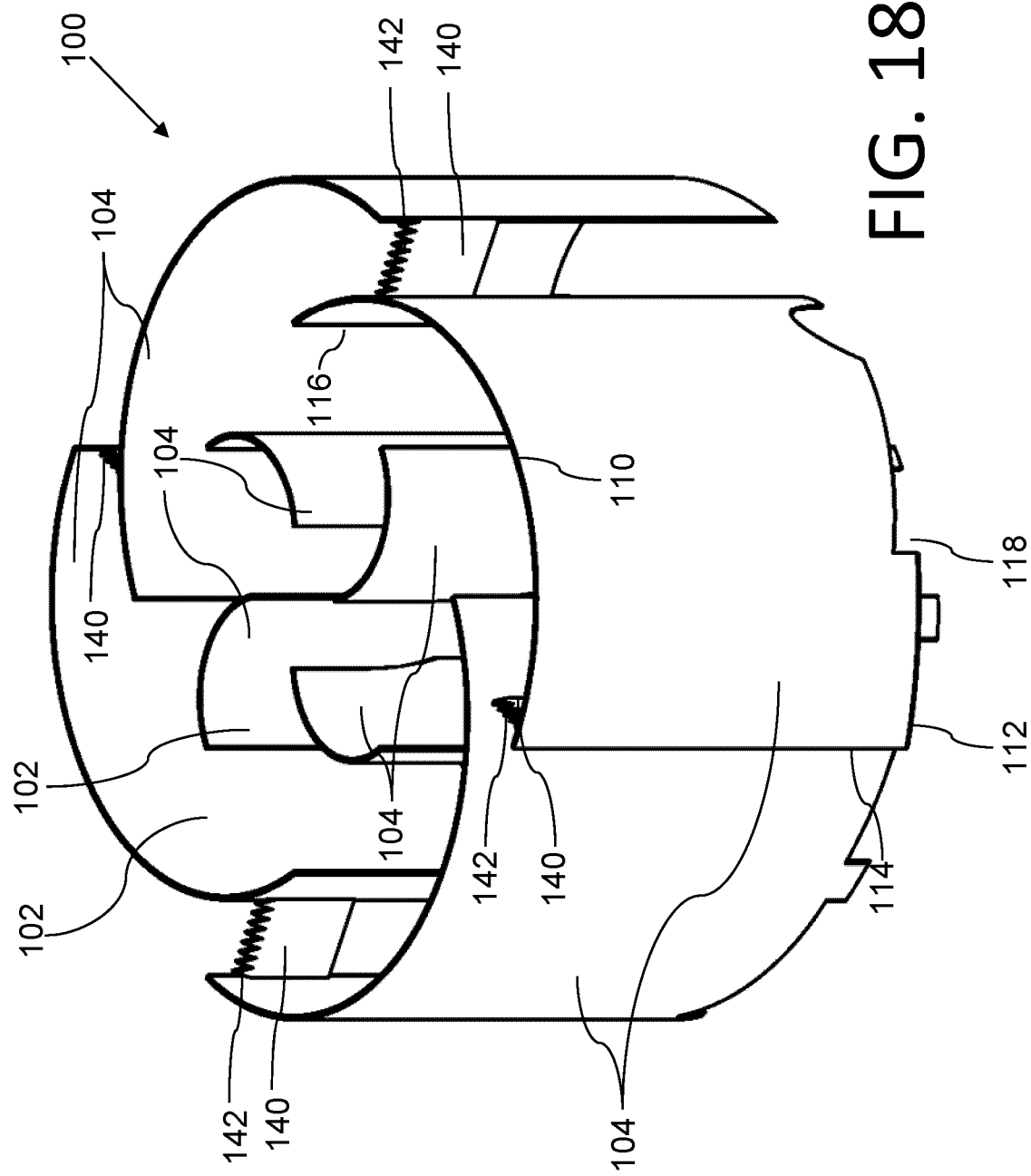
FIG. 18 is a perspective view of the vortex breaker of FIG. 17.

An example of vanes with an infinite radius of curvature is shown in FIG. 16, where the inner set of vanes 102 are planar, and extend out from the center of the vortex breaker. In addition, as shown in FIG. 16, the inner set of vanes 102 may extend radially outward from a central axis, while the outer set of vanes 102 are angled in a rotational direction. As discussed elsewhere, there may be more than one outer set of vanes that redirect the rotational direction of the fluid flow. At the center of the inner set of vanes 102, the vanes may be connected together such that the fluid flow is redirected at the center of the vanes 102.

As can be seen in FIG. 11, vanes 104 are arranged in a circle around the base of vessel 12 and angled to promote the rotation of the flow, with two sets of vanes 102 in concentric circles. The direction of rotation of the outermost set of vanes 102 is in the direction of the expected rotational flow of fluid within the tank, or in other words, the outermost set of vanes 102 are oriented such that outer edge 114 is spaced outward relative to inner edge 116, while the inner set of vanes 102 are oriented with outer edge 114 spaced inward relative to inner edge 116. The orientation of each set 102 will alternate to create eddies in the flow, where particulate matter drops out of suspension. Providing more than one set of vanes 102 that are oriented in opposite directions causes flow to reverse direction as the flow moves between the sets of vanes 102. This change in direction can help to shake sand out of suspension, because the sand cannot change direction as quickly as the fluid. Due to the position and orientation of vanes 104, the path through vortex breaker 100 is a longer pathline for the sand, which increases its retention time inside of the vessel before it would be at risk of being carried out. This additional time means that the sand is more likely to settle, because it is able to descend lower inside of the vessel due to its specific gravity.

As will be understood, various advantages may be had through an appropriate design of vortex breaker 100. By way of example, vortex breaker 100 may be used to create a dead space in the bottom of vessel 12 where sand can accumulate to improve the sand retention at high flow rates, where the storage capacity of vessel 12 tends to decrease as flow rates increase. This dead space may still allow sand to migrate across the vanes at their base through slots 118 cut in them near the inner wall 14 of vessel 12. This allows sand to build up evenly across the entire vessel. Vortex breaker 100 may also be designed to more effectively reduce vertical recirculation in vessel 12, such that sand around the edges is less likely to be pulled up to the surface.

Vanes 104 as shown have slots or holes 118, which allow sand to drain through and build up at the bottom of vessel 12. In addition to aspects discussed elsewhere, features that may be varied from this embodiment include: the number of sets of vanes 102, the number of vanes 104 in each set 102, the radius of the shape (typically circular) around which vanes 102 are spaced, the radius of curvature of vanes 102, either as a set, subset, or individually, the aspect ratio of vanes 102 (i.e., vanes 102 may be stretched or squeezed in some direction), etc.

The position of the vanes in the depicted embodiment is determined by a distance 122 from the center or vertical axis 121 of vessel 12 to the outside edge 114 and inside edge 116. Outside edge 114 and inside edge 116 may be placed at a distance between a radius of zero and the outside radius of the vessel. Each vane 104 has a radial travel distance 124, which is the difference in the distances 122 from the center axis of first edge 114 and second edge 116. In the depicted embodiment, the total radial travel distance as a sum of radial distances 124 of all vane sets 102 does not exceed the total radius of the vessel. In other words, an edge of a vane 104 in an outer set of vanes 102 is not closer to axis 121 of the vessel than an edge of a vane 104 in an inner set of vanes 102. Other designs may have some overlap between vanes 104 in adjacent sets of vanes 102, provided that the combination of the radial travel distances does not exceed the overall radius of the vessel. For example, if the vanes 102 in the outer set 102 do not go all the way to the inner wall 14 of vessel 12, then there could be some overlap between sets of vanes 102.

Vanes 104 may also have an angle of spread 126 relative to vertical axis 121 of the vessel. Vanes 104 that have a non-zero angle of spread 126 have either top edge 110 further away from the center than bottom edge 112, or bottom edge 112 further away from top edge 110. Angle of spread 126 in the depicted embodiment may range from −30 degrees to 30 degrees, where a positive angle is defined as top edge 110 being further away from the center axis than bottom edge 112.

Figure 12:
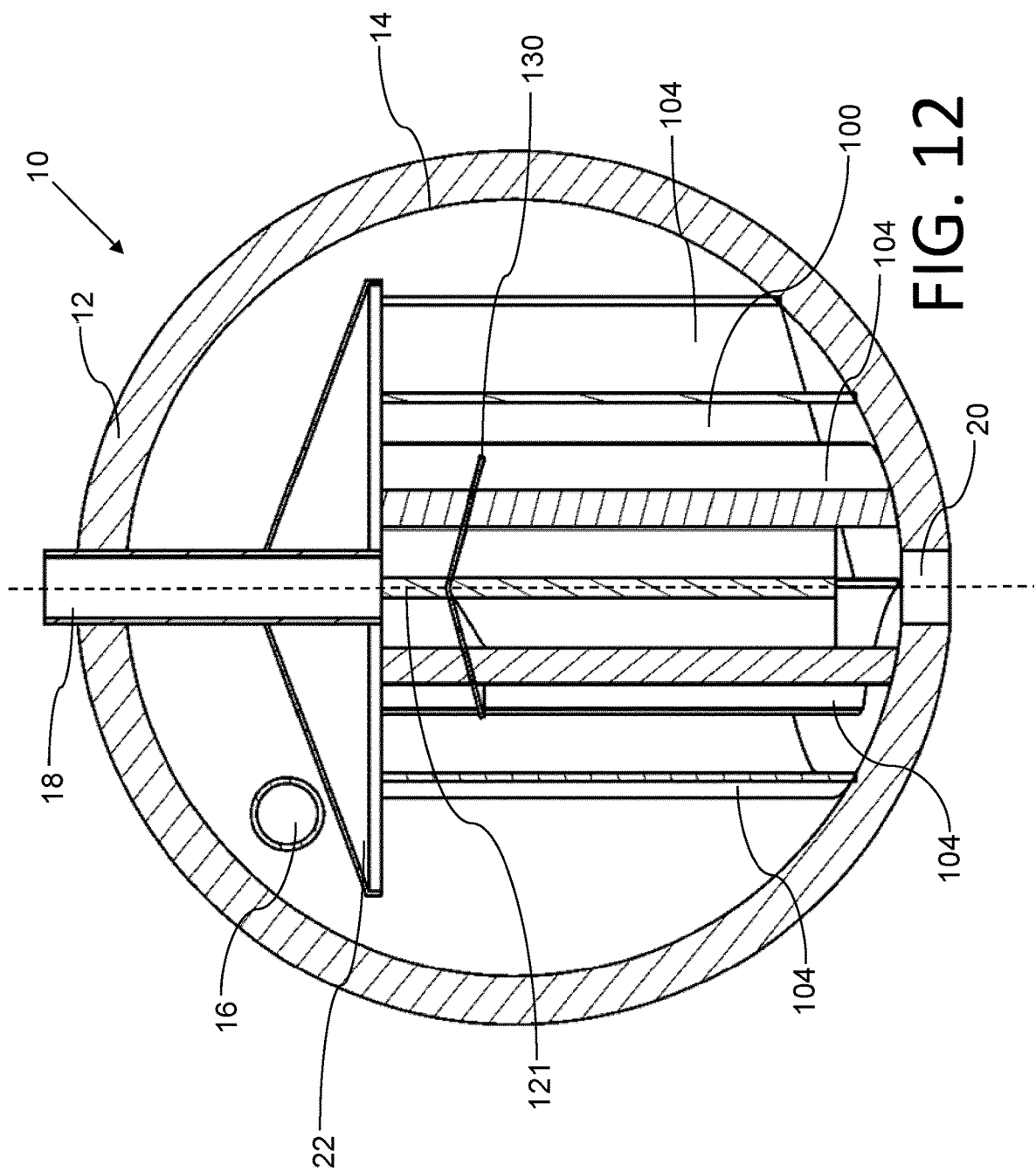
FIG. 12 is a side elevation view in section of a further alternative of a particulate separator with a lateral baffle.
Figure 13:
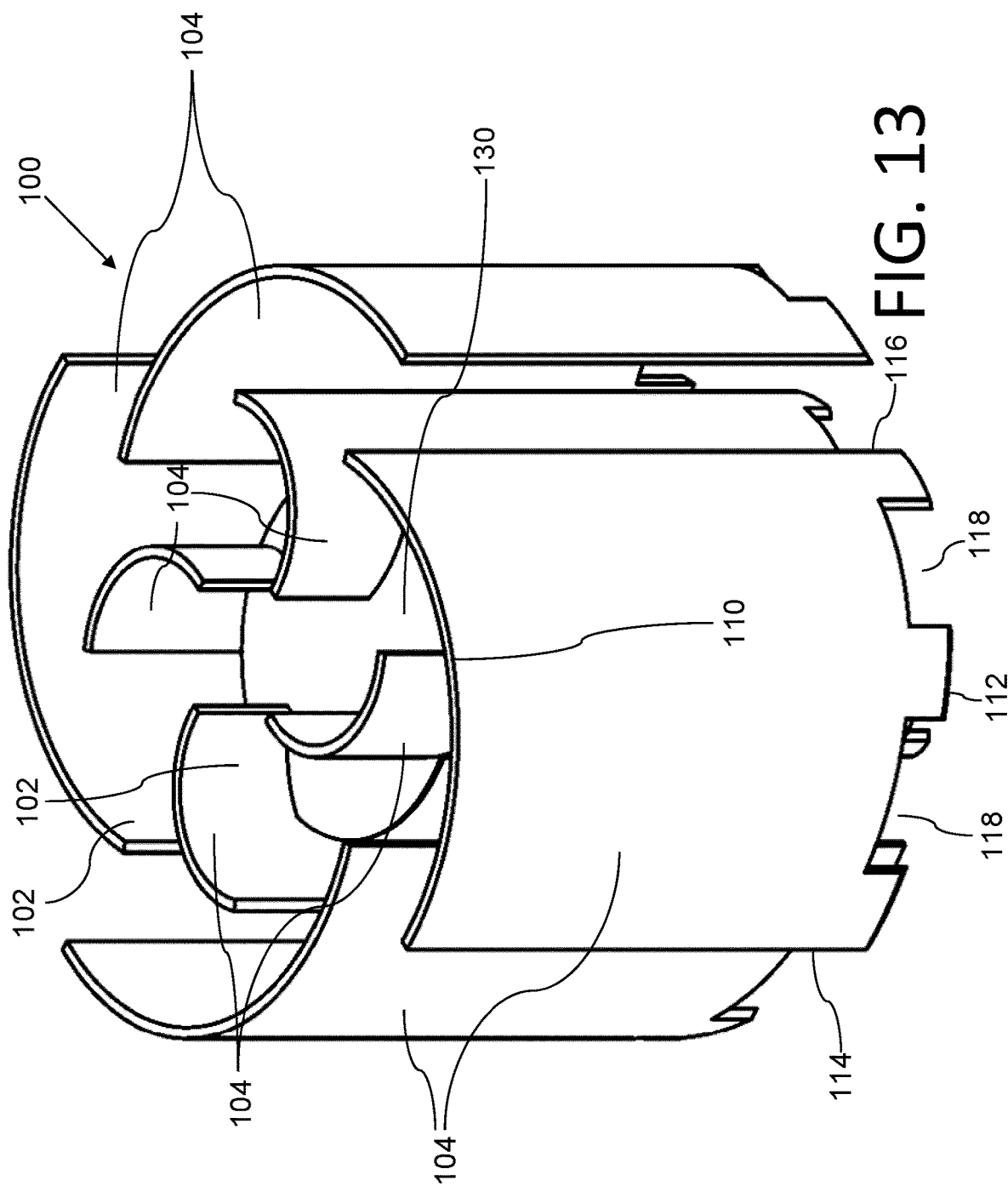
FIG. 13 is a perspective view of the baffles of the particulate separator of FIG. 12.

Referring to FIGS. 12 and 13, additional benefits may be had by providing a lateral baffle 130 that is positioned along the height of vanes 102. As shown, baffle 130 has faces that face vertically and is centered on the axis 20 of vessel 12. Lateral baffle 130 may take various shapes, such as conical (as shown), planar, annular, etc. As shown, lateral baffle 130 serves to block the flow coming back up from the bottom of separator vessel 12 and are centered on axis 20 of vessel 12 such that the flow is disruption to cause the fluids to begin flowing in the opposite direction of rotation through the sets of vanes 102 below lateral baffle 130 compared to above lateral baffle 130. While a single baffle 130 is shown, there may be multiple lateral baffles 130 added atop one another, such as concentrically positioned, in which case the flow may change the direction of rotation at each vertical level that is defined by baffles 130.

Figure 14:
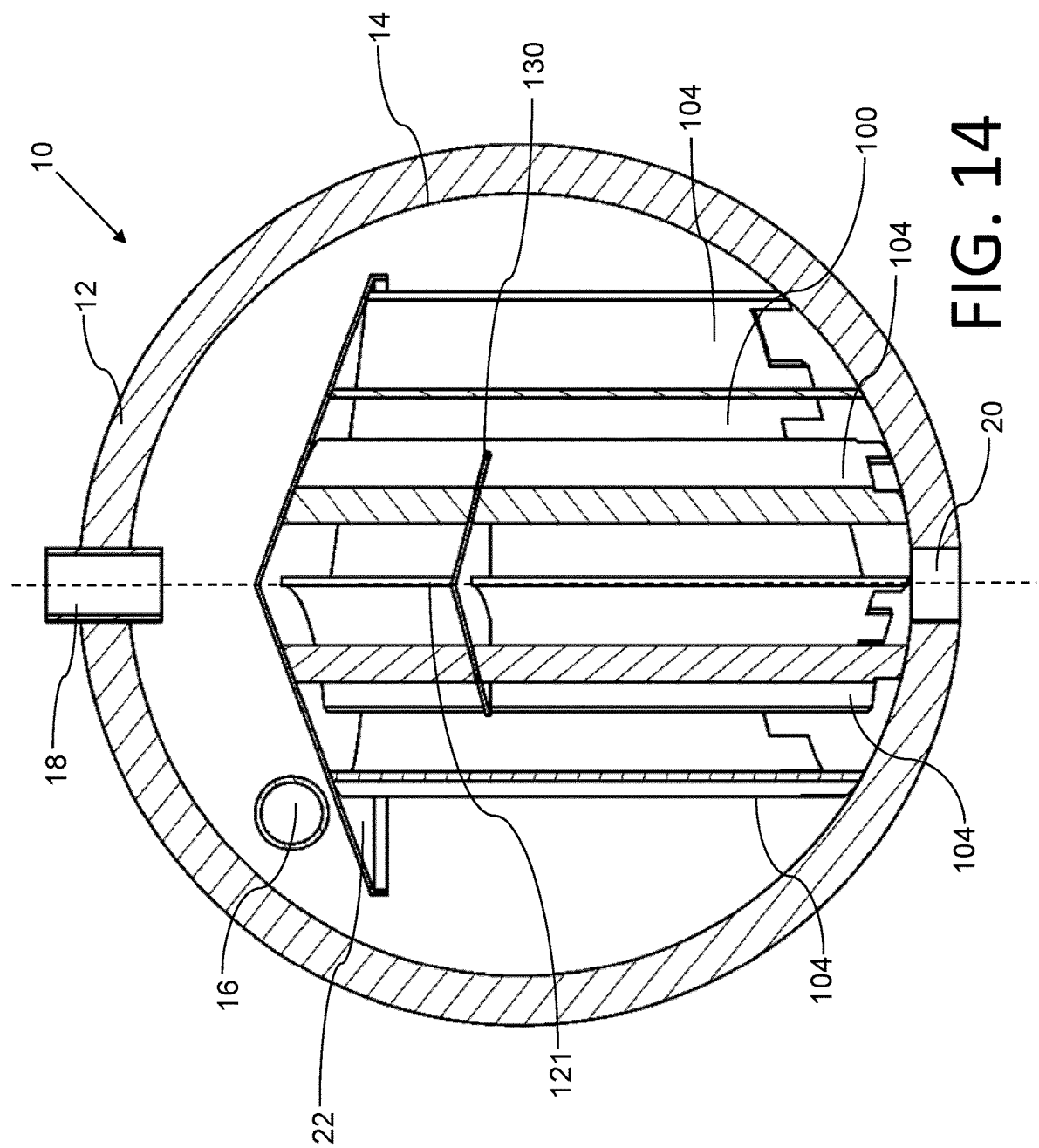
FIGS. 14 and 15 are side elevation views in sections of further alternatives of a particulate separator.
Figure 15:
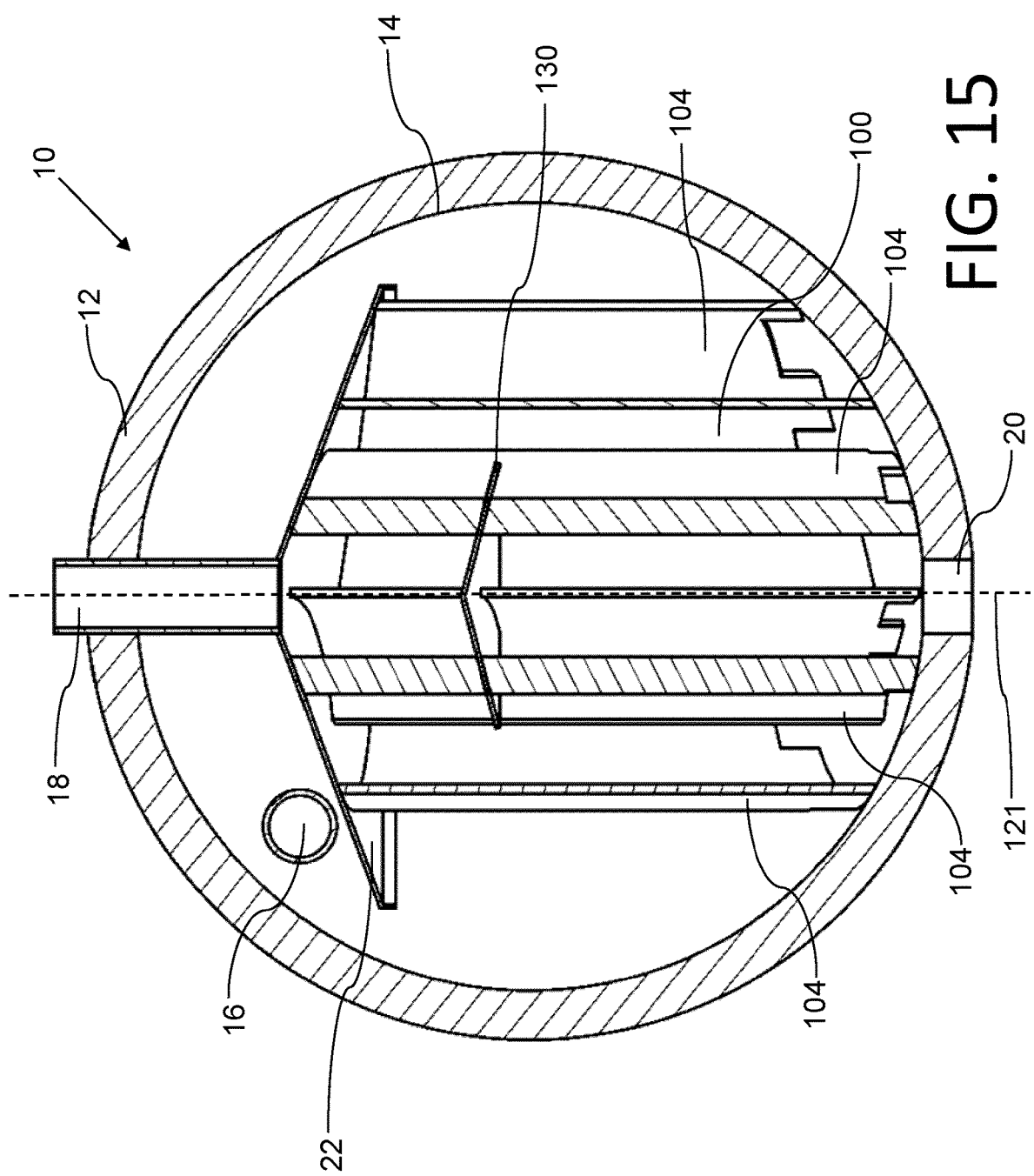
Figure 19:
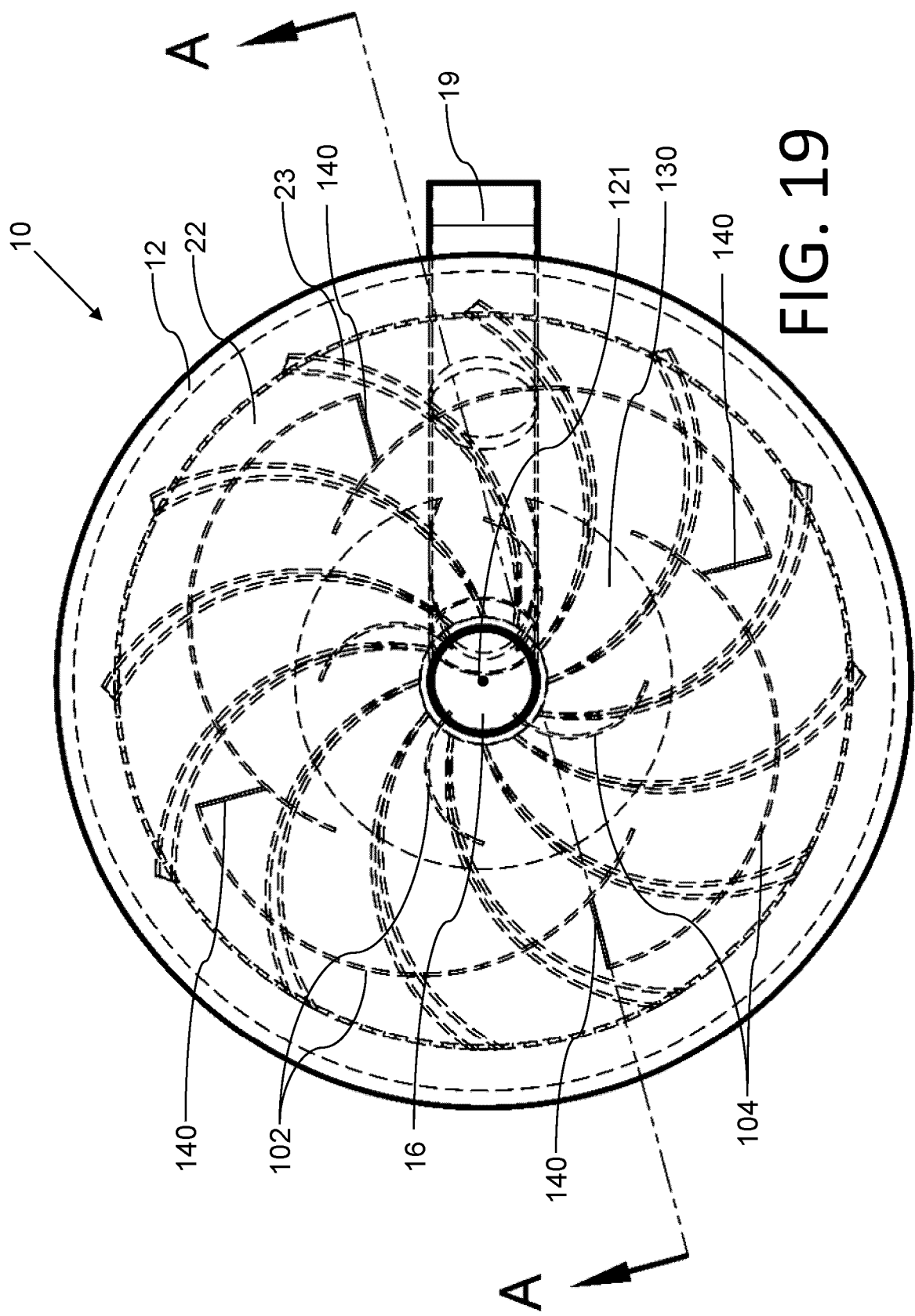
FIG. 19 is a partially transparent, top plan view of a separator with a central outlet, and incorporating the vortex breaker of FIG. 17.

Referring to FIGS. 12 and 15, first outlet 18 may extend at or below the top edge of one or both set of vanes 102, depending on the relative height of each. As shown, first outlet 18 of separator vessel 12 may extend with a drop pipe down into the vortex breaker. When the fluid flow entering vessel 12 is primarily gas, outlet 18 may be used to define the liquid level that may build up in separator vessel 12 in the case of gas presence. The sets of vortex-breaking vanes 102 may be cut off at the same level of elevation as the drop pipe, or possibly extend upwards into the freeboard gas space, as shown in FIGS. 12 and 15, respectively. In the depicted example, hood 22 over vortex breaker 100 may act as a covering that blocks any flow from entering or exiting the vortex breaker 100 from above (excepting to the outlet of the separator). This covering may be flat or slanted, as in the case of a conical dome covering as shown. There may be a gap between the top of the vanes and the covering which allows freeboard gas to pass above vortex breaker 100. Referring to FIG. 14, both inlet 16 and first outlet 18 may be positioned above hood 22, where the fluid flow descends below hood 22 to allow sand to separate from fluid flow, where it is collected adjacent to sand/liquid exit 20, while the gas or vapor phase is allowed to exit via outlet 18 after returning above hood 22. Referring to FIG. 19 and FIG. 20, a central outlet 19 may be located between lateral baffle 130 and hood 22 that allows for fluid to exit separator 10. FIG. 20 depicts the cross section of separator 10 along the line A-A in FIG. 19.

Referring to FIG. 17 to FIG. 20, flow barriers 140 may be provided toward the top of vanes 104. As can be seen, vanes 104 are spaced within an outer perimeter of hood 22, such that fluid flowing down and under hood 22 will encounter vanes 104 and flow barriers 140. Each flow barrier 140 has a top edge 142, which may be serrated as shown, that corresponds generally to the expected fluid/vapour interface below hood 22, and extends down from that interface. The height flow barrier 140 may vary, although it is generally expected that it will be a portion of the height of vanes 104, such that fluid flow is permitted between vanes 104 and below barriers 140. While flow barriers 140 are open to the top of the baffle 38, barriers 140 may also define openings that have a closed top and extend into the expected vapor space under hood 22. In situations where both water and hydrocarbon condensates are present in the liquid being separated, flow barriers 140 may act to collect and control the flow of condensate through vessel 10, causing it to flow over flow barrier 140 while water flows under. In some embodiments, the lower portion of flow barrier 140 may have triangular teeth, perforating holes, or slots on it to cause more turbulence within the flow of fluid and to pierce the surface tension between the water and condensate phases. Flow barriers 140 may be used to control the level of the condensate and to encourage sand to collect at the bottom of vessel 10. As shown, flow barriers 140 extend between adjacent vanes 104. As such, vanes 104 spiral inward toward flow barriers 140 such that vanes 104 are able to use the rotation of the fluid within the vessel to collect condensate and divert it over flow barrier 140. As depicted, flow barriers 140 are parallel to vertical axis 121, however it will be understood that flow barriers 140 may be angled or curved such that the entirety of flow barriers 140 are not parallel to vertical axis 121, but still remain substantially vertical such that they impede the radial flow of fluid that passes around flow barrier 140 and further separate sand out from the fluid.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A vortex breaker for a particulate separator, the particulate separator comprising a vessel having an inner wall, an inlet, a first outlet, and a second outlet adjacent to a bottom of the vessel, the vortex breaker comprising:
    a first set of vanes spaced along a perimeter of a first shape;
    a second set of vanes spaced along a perimeter of a second shape, the perimeter of the second shape residing within the perimeter of the first shape; and
    a vertical axis positioned within the perimeter of the second shape;
    wherein:
        each of the vanes in the first set of vanes and the second set of vanes has a top edge, a bottom edge, an inside edge, and an outside edge;
        each of the vanes in the first set of vanes intersects the perimeter of the first shape, and the outside edge is spaced outward and in a first rotational direction about the vertical axis relative to the inside edge;
        each of the vanes in the second set of vanes intersects the perimeter of the second shape, and the outside edge is spaced outward and in a second rotational direction about the vertical axis relative to the inside edge, the second rotational direction being opposite the first rotational direction; and
        the first set of vanes and the second set of vanes define fluid flow paths between the outside edges of the vanes in the first set of vanes and the inside edges of the vanes in the second set of vanes.

2. The vortex breaker of claim 1, further comprising one or more additional sets of vanes spaced along one or more perimeters of one or more additional shapes that reside within the perimeter of the second shape.

3. The vortex breaker of claim 1, wherein the first and second sets of vanes each comprise three or more vanes.

4. The vortex breaker of claim 1, wherein each vane comprises a radius of curvature between the inside edge and the outside edge.

5. The vortex breaker of claim 4, wherein the radius of curvature of the vanes in the first set of vanes is in the direction of the first rotational direction, and the radius of curvature of the vanes in the second set of vanes is in the direction of the second rotational direction.

6. The vortex breaker of claim 1, wherein the perimeters of the first and second shapes define concentric circles around the vertical axis.

7. The vortex breaker of claim 1, wherein the bottom edges of the vanes in at least the second set of vanes define openings between the vanes and the inner wall of the vessel.

8. The vortex breaker of claim 1, wherein the top edges of the vanes in at least one of the first and second sets of vanes are spaced inward or outward from the bottom edges relative to the vertical axis.

9. The vortex breaker of claim 1, wherein the first and second sets of vanes are axially symmetric about the vertical axis of the first shape and the second shape.

10. The vortex breaker of claim 1, further comprising a laterally-oriented baffle that overlies the vertical axis at a point above the bottom edges of the vanes in the second set of vanes.

11. The vortex breaker of claim 1, wherein the inner edges of the vanes in the second set of vanes are connected together.

12. The vortex breaker of claim 1, further comprising one or more flow barriers connected between adjacent vanes of the first set of vanes or the second set of vanes.

13. A vortex breaker for a particulate separator, the particulate separator comprising a vessel having an inner wall, an inlet, a first outlet, and a second outlet adjacent to a bottom of the vessel, the vortex breaker comprising:
    a first set of vanes spaced along a perimeter of a first shape;
    a second set of vanes spaced along a perimeter of a second shape, the perimeter of the second shape residing within the perimeter of the first shape; and
    a vertical axis positioned within the perimeter of the second shape;
    wherein:
        each of the vanes in the first set of vanes and the second set of vanes have has a top edge, a bottom edge, an inside edge, and an outside edge, the outside edge being spaced outward relative to the inside edge;
        each of the vanes in the first set of vanes intersects the perimeter of the first shape and each of the vanes in the second set of vanes intersects the perimeter of the second shape;
        the outside edges of the vanes in the first set of vanes are spaced in a first rotational direction about the vertical axis relative to the inside edge; and
        the first set of vanes and the second set of vanes define fluid flow paths between the outside edges of the vanes in the first set of vanes and the inside edges of the vanes in the second set of vanes.

14. The vortex breaker of claim 13, wherein the inner edges of the vanes in the second set of vanes extend radially outward from the vertical axis.

15. A particulate separator comprising:
- a vessel having an inner wall, an inlet, a first outlet, and a second outlet adjacent to a bottom of the vessel; and
- a vortex breaker within the vessel, the vortex breaker comprising:
  - a first set of vanes spaced along a perimeter of a first shape;
  - a second set of vanes spaced along a perimeter of a second shape, the perimeter of the second shape residing within the perimeter of the first shape; and
  - a vertical axis positioned within the perimeter of the second shape;
  - wherein:
    - each of the vanes in the first set of vanes and the second set of vanes has a top edge, a bottom edge, an inside edge, and an outside edge;
    - each of the vanes in the first set of vanes intersects the perimeter of the first shape, and the outside edge is spaced outward and in a first rotational direction about the vertical axis relative to the inside edge; and
    - each of the vanes in the second set of vanes intersects the perimeter of the second shape, and the outside edge is spaced outward and in a second rotational direction about the vertical axis relative to the inside edge, the second rotational direction being opposite the first rotational direction; and
    - the first set of vanes and the second set of vanes define fluid flow paths between the outside edges of the vanes in the first set of vanes and the inside edges of the vanes in the second set of vanes.

16. The particulate separator of claim 15, further comprising an internal structure positioned within the vessel and adjacent to the inlet, the internal structure inducing particulates to separate from an inlet stream of fluid, the internal structure being vertically above the vortex breaker within the vessel.

17. The particulate separator of claim 16, wherein the internal structure induces the inlet stream of fluid to rotate in the first rotational direction.

18. The particulate separator of claim 16, wherein at least one of the first and second sets of vanes extends between the bottom of the vessel and the internal structure.

19. The particulate separator of claim 18, wherein the at least one of the first and second sets of vanes extends into the internal structure.

20. The particulate separator of claim 18, wherein a flow passage is defined between the top edges of the vanes in the at least one of the first and second sets of vanes and the internal structure.

21. The particulate separator of claim 15, wherein the first outlet is positioned at or below the top edges of the vanes of one or both of the first and second sets of vanes.

22. The particulate separator of claim 15, wherein the vortex breaker further comprises one or more additional sets of vanes spaced along one or more perimeters of one or more additional shapes that reside within the perimeter of the second shape.

23. The particulate separator of claim 15, wherein the first and second sets of vanes each comprise three or more vanes.

24. The particulate separator of claim 15, wherein each vane comprises a radius of curvature between the inside edge and the outside edge.

25. The particulate separator of claim 24, wherein the vanes in each set of vanes have a radius of curvature in the same direction.

26. The particulate separator of claim 25, wherein the radius of curvature of the vanes in the first set of vanes is in the direction of the first rotational direction, and the radius of curvature of the vanes in the second set of vanes is in the direction of the second rotational direction.

27. The particulate separator of claim 15, wherein the perimeters of the first and second shapes define concentric circles around the vertical axis.

28. The particulate separator of claim 15, wherein the bottom edges of the vanes in at least the second set of vanes define openings between the vanes and the inner wall of the vessel.

29. The particulate separator of claim 15, wherein the top edges of the vanes in at least one of the first and second sets of vanes are spaced inward or outward from the bottom edges relative to the vertical axis.

30. The particulate separator of claim 15, wherein the first and second sets of vanes are rotationally symmetric.

31. The particulate separator of claim 15, further comprising one or more flow barriers connected between adjacent vanes in the first set of vanes or the second set of vanes.

* * * * *